US010896503B2

(12) United States Patent
Viola

(10) Patent No.: US 10,896,503 B2
(45) Date of Patent: Jan. 19, 2021

(54) IDENTIFICATION OF AREAS OF INTEREST IN IMAGING APPLICATIONS

(71) Applicant: International Business Machines Corporation, Armonk, NY (US)

(72) Inventor: Raffaella Viola, Rome (IT)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 15/933,561

(22) Filed: Mar. 23, 2018

(65) Prior Publication Data
US 2019/0295255 A1 Sep. 26, 2019

(51) Int. Cl.
*G06T 7/00* (2017.01)
*G06T 15/08* (2011.01)
*G06K 9/62* (2006.01)
*G06K 9/32* (2006.01)

(52) U.S. Cl.
CPC .......... *G06T 7/0014* (2013.01); *G06K 9/3233* (2013.01); *G06K 9/6202* (2013.01); *G06T 15/08* (2013.01); *G06T 2207/10081* (2013.01); *G06T 2210/41* (2013.01)

(58) Field of Classification Search
CPC ... G06T 7/0014; G06T 15/08; G06T 2210/41; G06T 2207/10081; G06K 9/6202; G06K 9/3233; G06K 2209/05
USPC ....................................................... 382/131
See application file for complete search history.

(56) References Cited

U.S. PATENT DOCUMENTS

| 5,293,312 A | 3/1994 | Waggener |
| 5,297,037 A | 3/1994 | Ifuku |
| 5,381,518 A | 1/1995 | Drebin et al. |
| 2005/0190955 A1* | 9/2005 | Brown .................. G01R 33/56 382/128 |
| 2005/0207632 A1* | 9/2005 | Matsuura .............. G06T 7/0012 382/132 |
| 2010/0322375 A1 | 12/2010 | Hirokawa et al. |

(Continued)

FOREIGN PATENT DOCUMENTS

| EP | 0489908 B1 | 1/1995 |
| WO | 2004102482 A1 | 11/2004 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Amandeep Saini
(74) *Attorney, Agent, or Firm* — Jared C. Chaney

(57) ABSTRACT

A solution is proposed for analyzing an object. A corresponding method comprises providing one or more images of the objects (each comprising a plurality of cells containing corresponding values) to a computing system. The computing system retrieves a selected value reference and a selected shape reference for a selected characteristic of interest. The computing system identifies one or more areas of interest of the images according to the corresponding values matching the selected value reference and according to the corresponding cells matching the selected shape reference. A computer program product for performing the method and a corresponding system are also provided; moreover, a diagnostic method and a therapeutic method based on the same method are proposed.

19 Claims, 14 Drawing Sheets

(56) References Cited

U.S. PATENT DOCUMENTS

| | | | |
|---|---|---|---|
| 2014/0037177 A1* | 2/2014 | Endo | A61B 5/0037 |
| | | | 382/131 |
| 2014/0321608 A1 | 10/2014 | Ueki et al. | |
| 2016/0015355 A1 | 1/2016 | Yankelevitz et al. | |
| 2016/0025611 A1* | 1/2016 | Fujiwara | G01J 1/0422 |
| | | | 356/338 |
| 2016/0196660 A1* | 7/2016 | Prevrhal | G06T 7/11 |
| | | | 382/130 |
| 2016/0307424 A1* | 10/2016 | Mills | G06K 9/00771 |
| 2017/0068843 A1* | 3/2017 | Tian | G06K 9/00281 |
| 2019/0034596 A1* | 1/2019 | Hartmann | A61B 5/4842 |
| 2019/0311805 A1* | 10/2019 | Linguraru | G06K 9/6256 |

\* cited by examiner

IDENTIFICATION OF AREAS OF INTEREST IN IMAGING APPLICATIONS

BACKGROUND

The present disclosure relates to imaging applications, for example, medical imaging applications.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Imaging is a widespread technique that is routinely used to acquire visual representations (images) of objects, generally in digital form. Typical examples are medical imaging techniques, wherein images are acquired of body-parts inside corresponding patients (and then hidden by their skins) for diagnostic/therapeutic purposes; most of the medical imaging techniques are non-invasive, i.e., the images of the body-parts are inferred from responses to corresponding interrogation signals applied thereto (without the need of performing any surgery actions onto the patients).

For example, tomography techniques produce cross-sectional images (tomograms) representing corresponding slices of the body-part. Particularly, in Computed (Aided) Tomography (CT) techniques a high number of images of each slice are acquired from different angles by projectional radiography technique (usually based on X-rays), and the (cross-sectional) image of the slice is then calculated from them by applying tomographic reconstruction algorithms.

SUMMARY

In general terms, the present disclosure is based on the idea of identifying areas of interest of the images according to reference information.

Particularly, an aspect provides a method, a computer program product, and a system for analyzing an object. One or more images of the objects (each comprising a plurality of cells containing corresponding values) are provided to a computing system. The computing system retrieves a selected value reference and a selected shape reference for a selected characteristic of interest. The computing system identifies one or more areas of interest of the images according to the corresponding values matching the selected value reference and the corresponding cells matching the selected shape reference.

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, such as value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. Particularly.

DETAILED DESCRIPTION

Figure 1:
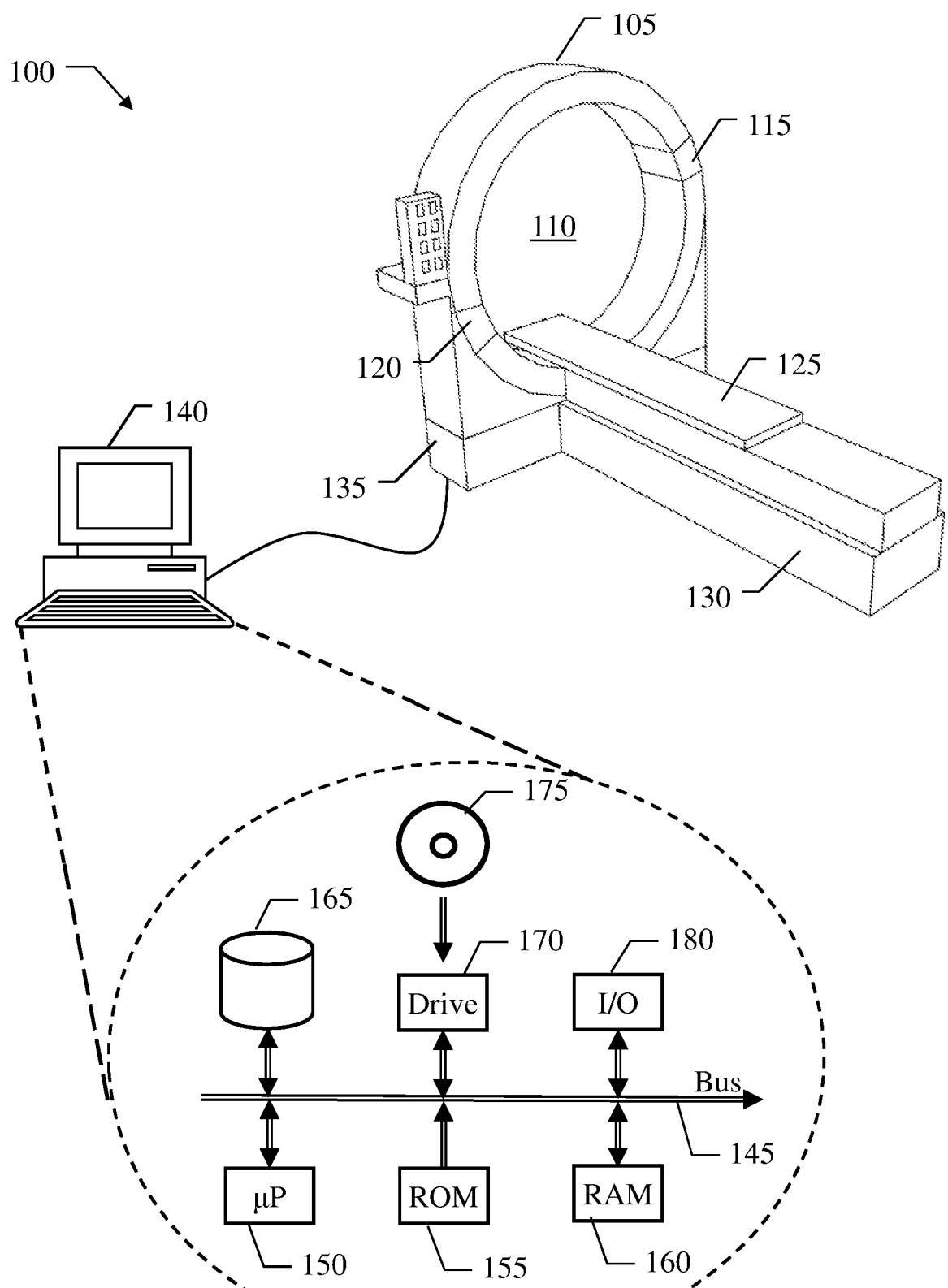
FIG. 1 shows is a pictorial representation of a Computed (Aided) Tomography (CT) scanner that may be used to practice the solution according to an embodiment of the present disclosure.

With reference in particular to FIG. 1, a pictorial representation is shown of a CT scanner 100 that may be used to practice the solution according to an embodiment of the present disclosure.

Particularly, the Computed (Aided) Tomography (CT) scanner (or tomograph) 100 is used to image a body-part of a patient to be analyzed (not shown in the figure). The CT scanner 100 comprises the following components.

A gantry 105 (in the form of a hollow ring or cylinder) has an opening 110 for receiving the patient. The gantry 105 holds an X-ray generator (or tube) 115 and an X-ray detector 120 that are arranged at opposite side of the opening 110; the gantry 105 is provided with a motor (not visible in the figure) for rotating the X-ray generator 115 and the X-ray detector 120 together around the opening 110. A table 125 is used for laying down the patient; the table 125 is mounted in a slidable way onto a base 130, which is provided with a motor (not visible in the figure) for moving the table 125 horizontally in and out the opening 110. A controller 135 comprises all the components required to drive the X-ray generator 115 (for example, an output amplifier for applying X-ray radiations), to drive the X-ray detector 120 (for example, an input amplifier and an Analog-To-Digital Converter (ADC) for measuring the X-ray radiations) and to drive the motor of the gantry 105 and the motor of the base 130.

A computer 140 (for example, a Personal Computer, or PC) is used to operate the CT scanner 100; the computer 140 is coupled with the controller 135 from a control room (not shown in the figure), spaced apart from the other components of the CT scanner 100 (so as to be shielded from the X-ray radiations). The computer 140 comprises several units that are connected among them through a bus structure 145 (with one or more levels). Particularly, one or more microprocessors (μP) 150 control operation of the computer 140; a non-volatile memory (ROM) 155 stores basic code for a bootstrap of the computer 140 and a volatile memory (RAM) 160 is used as a working memory by the microprocessors 150. The computer 140 is provided with a mass-memory 165 for storing programs and data (for example, a hard-disk) and with a drive 170 for reading/writing removable storage units 175 (for example, optical disks such as DVDs). Moreover, the computer 140 comprises a number of controllers for peripheral, or Input/Output (I/O) units 180; for example, the peripheral units 180 comprise a monitor, a keyboard, a trackball and a network adapter (NIC) for connecting to a communication network, such as the Internet (not shown in the figure).

In operation, the X-ray generator 115 provides X-ray radiation formed by a fan of beams (primary beams) that irradiate a corresponding (transversal) slice of the body-part exposed thereto, perpendicularly to a longitudinal axis of the patient. The slice absorbs the X-ray radiation crossing it according to its characteristics, thereby attenuating the intensity thereof; particularly, structures that are denser (such as bones) absorb the X-ray radiation and then attenuate it with a higher rate than structures that are less dense (such as soft tissues). The X-ray detector 120 measures the X-ray radiation that remains after crossing the slice (remnant beams); this measure then indicates the total attenuation of each beam by the whole slice, and then its average density, along the direction of the beam (with the denser the slice the lower the value that is measured). The same operations are repeated while the X-ray generator 115 and the X-ray detector 120 rotate and the table 125 slides, so as to obtain a very high number of (radiography) images of the body-part representing its spiral scan along the longitudinal axis of the patient (transversally thereto).

The radiography images define raw data that are processed by applying tomographic reconstruction algorithms (based on the Radon transform, such as the Filtered Back Projection (FBP) and the Iterative Reconstruction (IR) algorithms), so as to calculate the distribution of the attenuation of the X-ray radiation throughout the body-part, and then the distribution of its density. This process generates a series of (input) CT images representing corresponding (transversal) slices of the body-part, generally spaced equally apart. Each CT image is defined by a matrix of (input) cells (for example, with 512 rows×512 columns) containing the (input) values of visualizing elements representing corresponding locations of the body-part; particularly, when the thickness of the slice is not negligible, the visualizing elements are voxels representing elementary volumes of the body-part (with all the voxels that define a voxel frame representing the slice). Each voxel value (for example, coded on 16 bits) defines a brightness of the voxel (e.g., from 0 for black to 65,536 for white) as a function of the attenuation, and then the density, of the corresponding location of the body-part (with the denser the location the lighter the voxel).

Historically, the slices of the body-part are perpendicular to a longitudinal axis of the patient (so that the corresponding images only provide transverse representations of the body-part). However, starting from the images of these slices, different representations of the body-part may be calculated. For example, three-dimensional (3D) models may be created by applying volume rendering techniques (such as based on edge detection algorithms) and then displayed with color, transparency and/or shading effects; moreover, images representing slices of the body-part along different planes may be created by applying multi-planar reconstruction techniques.

The images of the slices may also be used to simulate the acquisition of images (with projectional radiography techniques) from any viewpoint by applying projection techniques. In this way, it is possible to obtain any desired images without exposing the patient to further X-ray radiations that may be dangerous for his/her health (for example, images of different portions of the body-part, from different viewpoints and/or with different levels of detail); moreover, this allows obtaining images that are unfeasible in practice (for example, from viewpoints that are not accessible such as inside the body-part).

In any case, the images of the body-part may be used (for example, by displaying them onto a monitor) to detect possible areas thereof representing lesions (such as tumors); moreover, the images of the body-part may be used to monitor a response of a lesion to a treatment and then its effectiveness (for example, the result of chemotherapy applied to a tumor).

However, the identification of the lesions and/or their monitoring is challenging; in any case, this is essentially a manual task strongly depending on personal skills and then prone to errors.

The above-mentioned projection techniques may also be used to support radiotherapy to be applied to lesions (for example, in oncology) by assessing the effect of a corresponding radiation onto the body-part; the obtained information allows choosing a configuration of the radiotherapy reducing its side-effects onto healthy tissues of the patient, and particularly its organs at risk (OARs).

In this case as well, the identification of a (projection) solid to be projected, representing a specific portion of the body-part, is essentially a manual task. Therefore, the correct identification of the projection solid is time consuming (since it generally requires an unpredictable number of attempts before finding an acceptable definition thereof) and in any case it strongly depends on personal skills and then is prone to errors as well.

Figure 2:
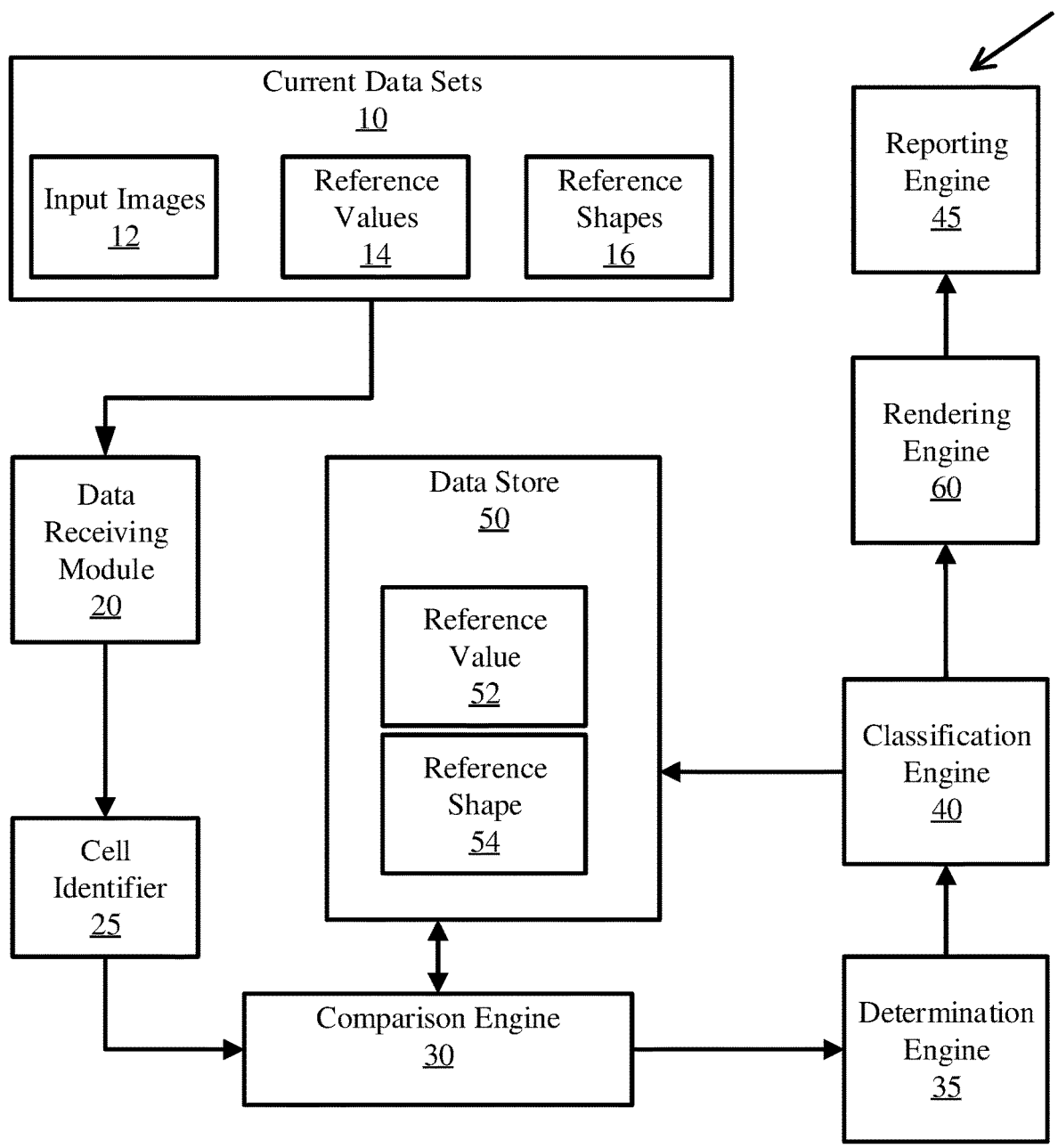
FIG. 2 is a system diagram according to an embodiment of the present disclosure.

FIG. 2 is as block diagram illustrating components of an object identification tool according to one illustrative embodiment. Object identification system 01 includes a current data sets 10 (including input images 12, reference values 14, and/or reference shapes 16), a data receiving module 20, a cell identifier 25, a comparison engine 30, a determination engine 35, a classification engine 40, a data store 50 with a plurality of data sets such as reference values 52 and reference shapes 54, a rendering engine 60, and a reporting engine 45. In some embodiments, system 01 also includes a rendering engine 60. In some embodiments, one or more sets of information, such as reference values 52 and reference shapes 54, are input into the system. In some embodiments some information is input into system 01 and other information is learnt through machine learning or cognitive analysis. In some embodiments, system 01 uses a cloud computing environment. For example, information can be stored or accessed over a storage devices (nodes) and accessed as a storage area network (SAN). In some embodiments, data store 50 denotes any information repository. In some embodiments, data store 50 can be or includes a database, data repositories that include unstructured data, data sets, etc. Object identification system 01 may determine a category of image classification the feature is related to.

Object identification system 01 receives current data sets 10, through data receiving module 20, where each cell will be scored for reference value. In some embodiments, data receiving module 20 is configured to receive data over a network, a graphical user interface, the cloud, and/or any other means of transferring data. In some embodiments, reference values 14 and/or 52 contains sources of reference values such as white papers, data sheets, publications, manuals, instructional texts, general guidelines, and/or rules for classes or types of images. In some embodiments, reference values 14 contain documents or data relating to a specific reference value relating to a specific object (e.g., a tumor). For example, reference values could be extracted from patient specific records such as emails, recorded conversations, or memos discussing a patient. Datasets can be merged from multiple sources to compile relevant data. In some embodiments, recorded audio information can be transcribed using natural language processing (NLP).

In some embodiments, a method for identification of areas of interest includes providing, to data receiving module 20, one or more input images of the object, wherein each input image comprises a plurality of input cells, wherein each input cell has an associated input value, wherein each input cell has a location identifier corresponding to a part of the object, providing, to data receiving module 20, one or more reference values, providing, to data receiving module 20, one or more reference shapes 16 and/or 54, identifying, by a cell identifier 25, one or more candidate cells of the plurality of input cells based on the associated input value for one or more of the input cells and one or more reference shapes 16 and/or 54, identifying, by cell identifier 25, one or more areas of interest based on the identified one or more candidate cells, comparing, by comparison engine 30, one or more candidate cells to the one or more of reference shapes 16 and/or 54 to determine similarities, and reporting, via reporting engine 45 logically connected to a display, the candidate cells and results of the comparison.

In some embodiments, reporting engine 45 is configured to output one or more input images with the candidate cells highlighted. For example, reporting engine 45 could output one or more images of a body with a suspected tumor highlighted in red.

In some embodiments, reference shapes 16 are included in current data sets 10. In some embodiments, reference shapes 16 include a specific parameter for object identification system 01 to check for. In some embodiments, reference shapes 16 will direct object identification system 01 to check a specific set of graphical elements (e.g., curves or lines), such as those included in reference values 14 and/or 52, for any conflicts. In some embodiments, reference shapes 16 is not included in current data sets 10, and system 01 will determine what factors to use based on the information in current data sets 10 and/or data store 50.

In an embodiment, current data sets 10 includes reference shapes 16. For example, reference shapes 16 can be a partial shape or a shape feature, a fully completed shape, or a section of a shape. In some embodiment, designs are derived from previous images. In an embodiment, current data sets 10 includes design data relating to current reference shapes 16. In an embodiment, system 01 receives, by data receiving module 20, a baseline value to which the value references are referred from a memory, identifying, by cell identifier 25, a limit value of the input values for each of the input images, and normalizing, by comparison engine 30, each of the input images according to a comparison between the limit value of each input image and the baseline value. In an embodiment, system 01 collects, by data receiving module 20, one or more reference images for each of the areas of interest, determines, by classification engine 40, the value reference and the shape reference for each area of interest according to a corresponding reference images, and stores, by classification engine 40, a value reference and a shape reference of each for area of interest into data store 50.

In an embodiment, rendering engine 60 take two dimensional images and creates or renders a three-dimensional shape of a candidate object. In an embodiment, comparison engine 30 compares the identified candidate cells in two or more of the one or more input images; and rendering engine 60 renders (e.g., determines or creates) a three-dimensional shape of a candidate object based on the comparing. In an embodiment, system 01 simulates, by rendering engine 60, an effect irradiating a portion of the object represented, at least partially, by the candidate cells, and outputs, by reporting engine 45, the effect. In an embodiment, the simulating further comprises simulating, by determination engine 35, a plurality of simulated cells with corresponding simulated input values according to a projection solid of the object, determining, by determination engine 35, beam lines for the irradiation of the object, and calculating, by a classification engine 40, the simulated values each simulated cell according to a path of the beam lines according to the corresponding input value.

In an embodiment, each input image is a representation of a slice of the object and system 01 performs a method comprising calculating, by a classification engine 40, a spacing of the slices the input images represent, extracting, by determination engine 35, the spacing of the slices from the input images to determine filling factors, and rendering, by rendering engine 60, a three-dimensional representation of the object based on the filling factors. In an embodiment, each input image is a representation of a slice of the object. The system 01 calculates, by a classification engine 40, a spacing of the slices the input images represent, extracts, by determination engine 35, the spacing of the slices from the input images to determine filling factors, and renders, by rendering engine 60, a three-dimensional representation of the object based on the filling factors. In some embodiments, the identifying one or more areas of interest of each of the input images comprises scanning, by cell identifier 25, the input cells of the input image to identify corresponding starting cells of the areas of interest according to a comparison of the input values with the value reference, initializing, by classification engine 40, the areas of interest to the corresponding starting cells, and enlarging, by rendering engine 60, each of the areas of interest according to a comparison of the input values of the input cells moving along a plurality of enlarging directions irradiating from each of the corresponding starting cells in the input image. In some embodiments, the identifying one or more areas of interest of each of the input images further comprises scanning, by cell identifier 25, the input cells of the input image to identify the starting cells of the areas of interest as corresponding to the input values best matching a distinguishing level indicated in the value reference, and enlarging, by rendering engine 60, each of the areas of interest until a variation of the corresponding input values is within a variation threshold and the input values remain within a distinguishing range around the distinguishing level indicated in the value reference.

In an embodiment, the identifying one or more of the areas of interest further comprises identifying, by cell identifier 25, the areas of interest according to a comparison of a geometry, a boundary and/or a size of the areas of interest with a distinguishing geometry, a distinguishing boundary and/or a distinguishing size, respectively, indicated in the shape reference.

With reference now to FIG. 3A-FIG. 3D, the general principles are shown of the solution according to an embodiment of the present disclosure.

Figure 3A:
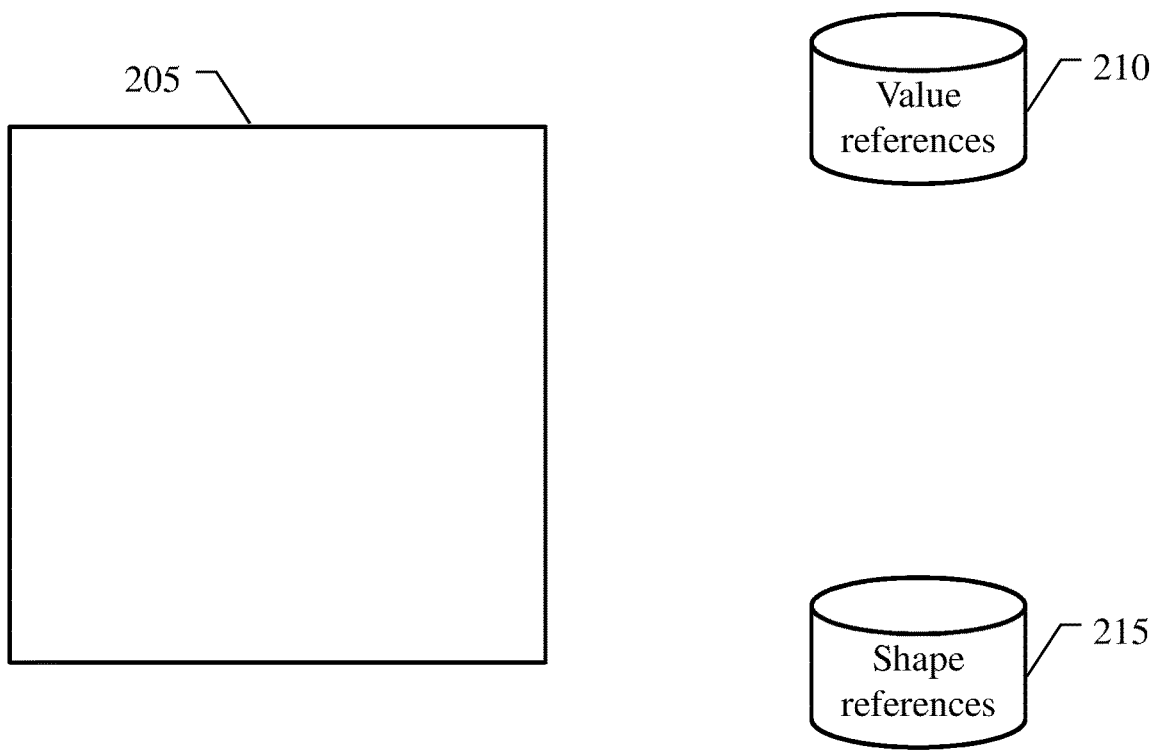
FIG. 3A-FIG. 3D show the general principles of the solution according to an embodiment of the present disclosure.

Starting from FIG. 3A, each CT image, denoted with the reference 205, is processed to identify one or more areas thereof having specific characteristics. For this purpose, one or more value references 210 and one or more shape references 215 are provided. The value references 210 and the shape references 215 identify corresponding characteristics of interest (for example, known lesions); particularly, for each characteristic of interest the value reference 210 indicates distinguishing pixel values thereof (for example, their range) and the shape reference 215 indicates distinguishing shapes thereof (for example, their geometry, boundary and size). The value references 210 and the shape references 215 may be learned automatically from one or more reference images for each of the characteristics of interest.

A candidate area (or multiple candidate areas) is identified in the CT image 205 that might represent a portion of the body-part with a selected characteristic of interest; the candidate area is determined according to the corresponding voxel values matching the (selected) value reference 210 of the selected characteristic of interest.

Figure 3B:
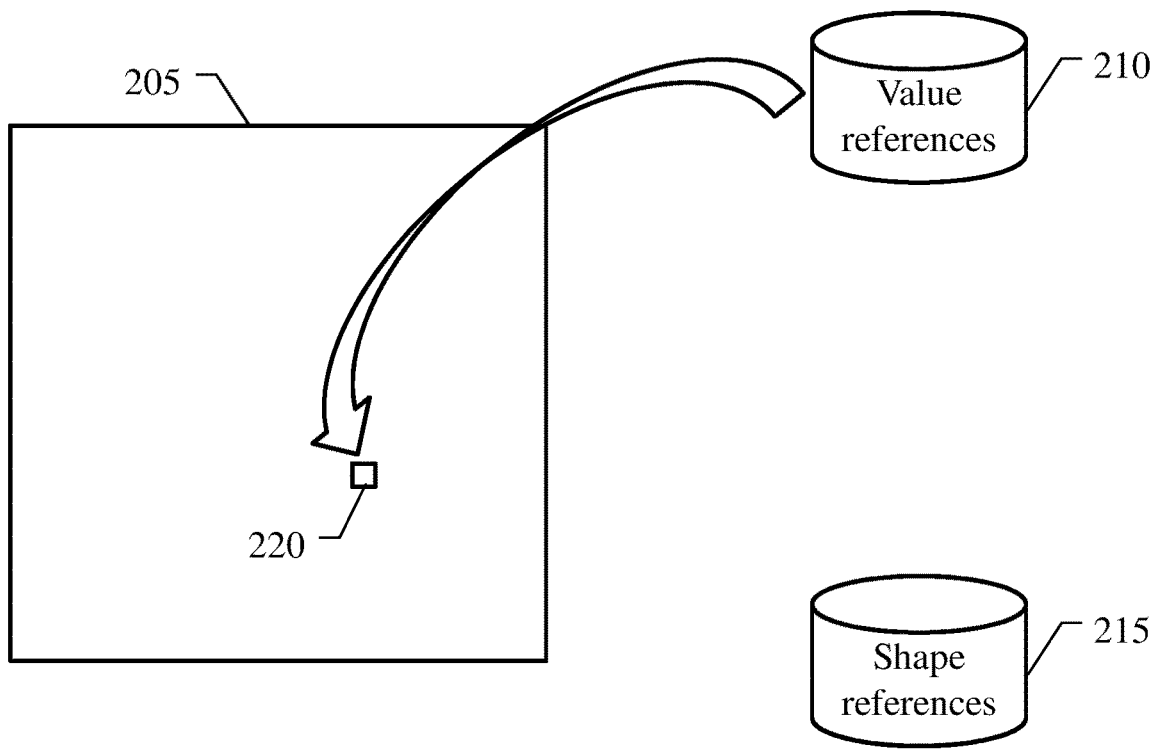

Moving to FIG. 3B, for example, for this purpose the cells of the CT image 205 are scanned to identify a starting cell 220 for the candidate area (for example, by selecting the cell having the voxel value that best matches the selected value reference 210). The candidate area is then initialized to the starting cell 220.

Figure 3C:
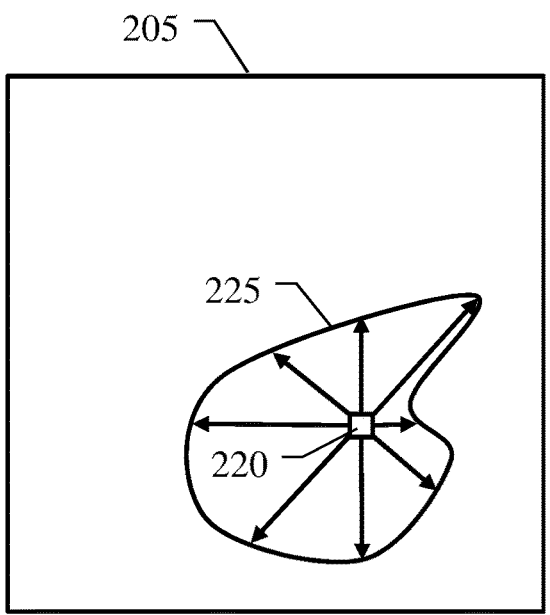
Figure 3C:
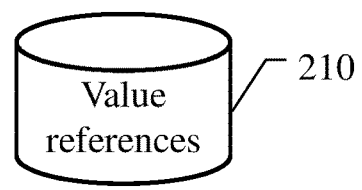
Figure 3C:
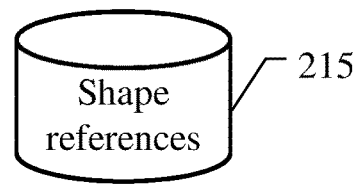

Moving to FIG. 3C, the candidate area is enlarged by moving along a plurality of (enlarging) directions, which extend radially from the starting cell 220; for example, the candidate area is enlarged along each enlarging direction until a variation of the corresponding voxel values remains within a (variation) threshold and the voxel values still match the selected value reference. The candidate area so obtained, denoted with the reference 225, then represents a corresponding portion of the body-part that is substantially homogenous and with a density corresponding to the selected characteristic of interest.

Figure 3D:
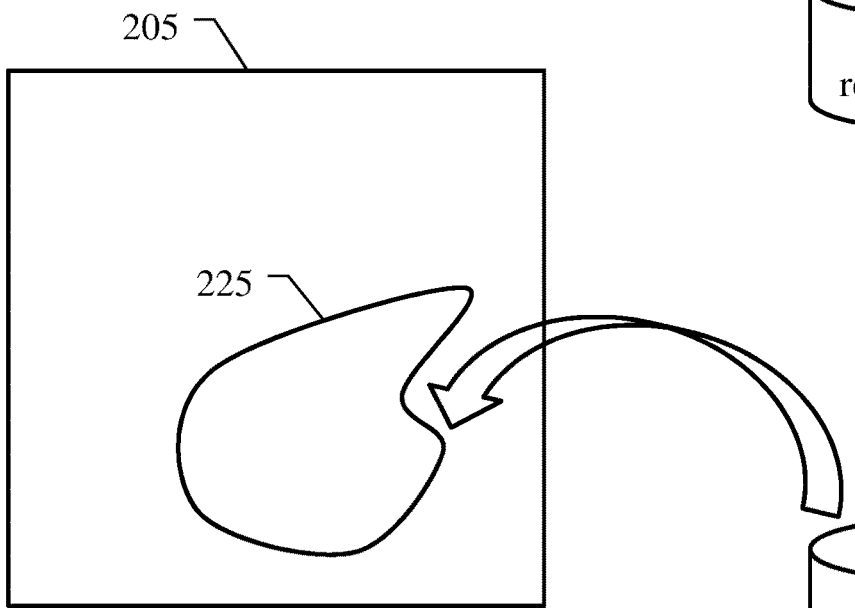
Figure 3D:
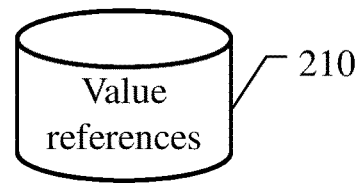
Figure 3D:
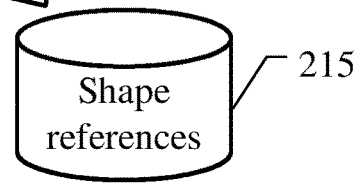

Moving to FIG. 3D, the candidate area 225 is identified as an area of interest according to the corresponding cells matching the (selected) shape reference 215 of the selected characteristic of interest; for example, this happens when the geometry, the boundary, and the size of the candidate area 225 match the selected shape reference. The area of interest 225 then represents a portion (of interest) of the body-part with the selected characteristic of interest.

The above-described solution facilitates the identification of portions of the body-part with any characteristics of interest (for example, specific lesions); particularly, this is achieved automatically (or at least with reduced manual intervention) so as to be less dependent on personal skills and then less prone to errors. All of the above significantly increases the accuracy of the obtained results.

This solution may be used for a number of purposes. For example, the CT images may be displayed with the areas of interest corresponding to any lesions that are highlighted (such as colored). In diagnostic applications, the CT images so updated significantly facilitate the detection of lesions; in therapeutic applications, the same CT images significantly facilitate the monitoring of a response of lesions to a treatment thereof (and then its effectiveness).

Figure 4A:
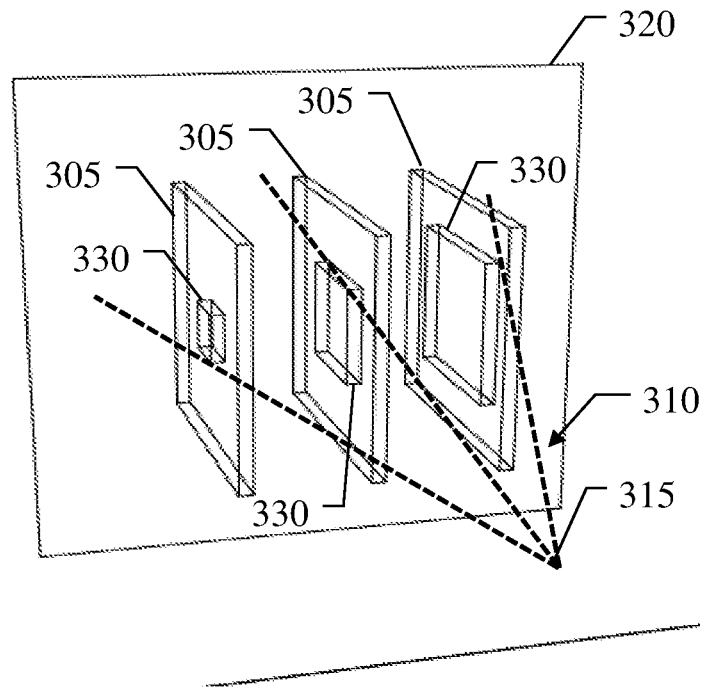
FIG. 4A-FIG. 4C show an example of application of the solution according to an embodiment of the present disclosure.
Figure 4B:
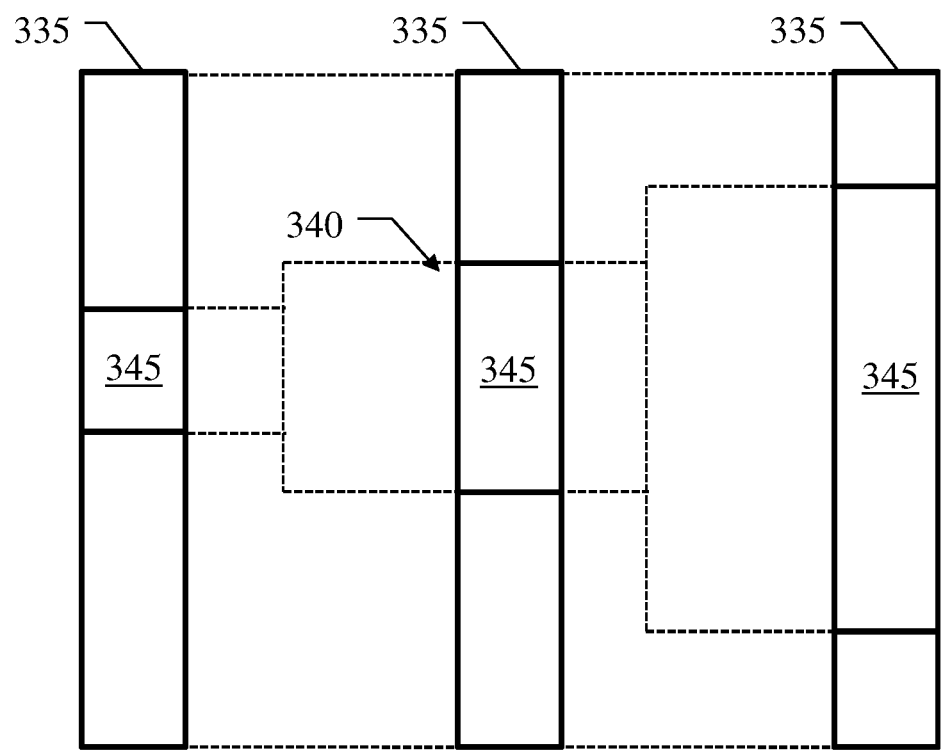
Figure 4C:
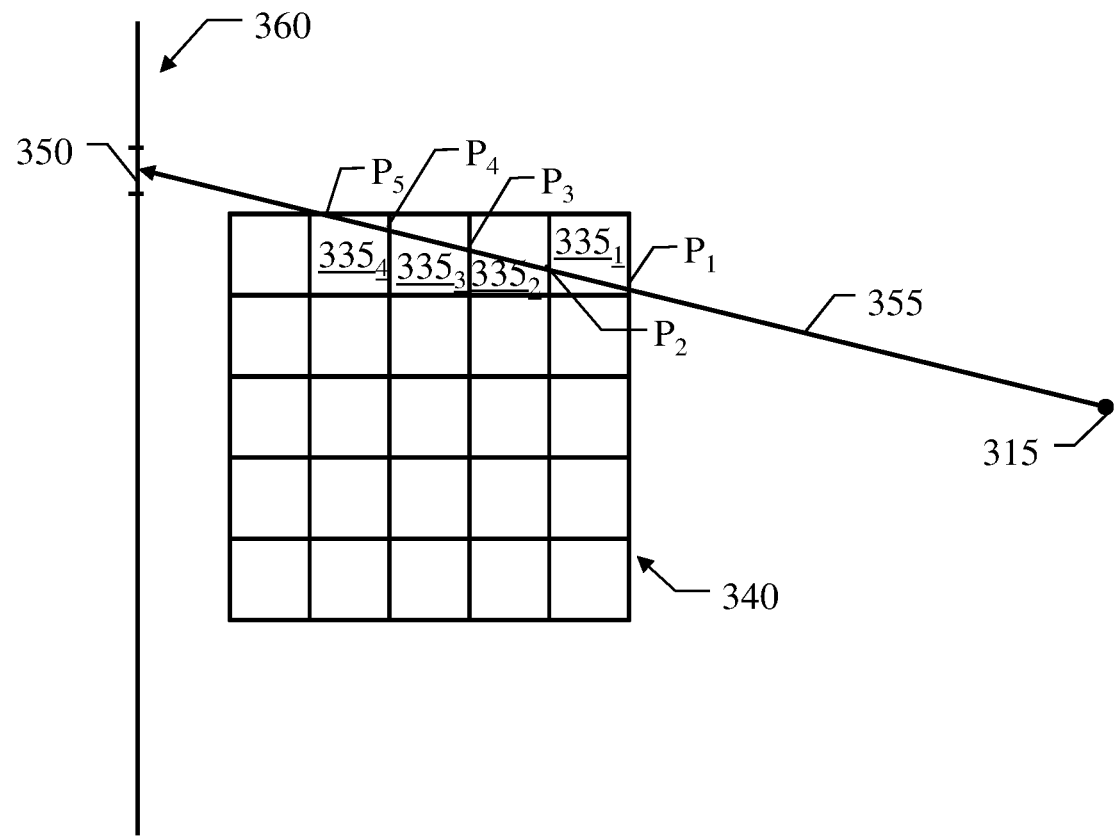

With reference now to FIG. 4A-FIG. 4C, an example is shown of application of the solution according to an embodiment of the present disclosure.

Starting from FIG. 4A, a plurality of CT images representing corresponding slices of the body-part, denoted with the reference 305, are used to simulate the acquisition (with projectional radiography technique) of a (simulated) image representing a projection of the body-part; particularly, the simulated image corresponds to an X-ray radiation 310 that irradiates the body-part from a viewpoint 315 and is measured in a projection square 320 onto a projection plane 325. The simulated image is defined by a matrix of (simulated) cells (for example, again with 512 rows×512 columns) containing the (simulated) values of visualizing elements, i.e., pixels, representing corresponding projection areas of the body-part from the viewpoint 315; each pixel value defines a brightness of the pixel as a function of a total attenuation, and then an average density, of the whole body-part along the X-ray radiation 310 crossing it (from the viewpoint 315 to the projection plane 325).

In the solution according to an embodiment of the present disclosure, the projection is limited to a portion of interest of the body-part, which is defined by portions of interests 330 of the slices 305 represented by the areas of interests of their CT images.

In this case as well, the portion of interest of the body-part to be projected is identified automatically (or at least with reduced manual intervention); therefore, the process is faster (since the desired result may be achieved directly) and more accurate (since it requires no or limited manual interventions).

Moving to FIG. 4B (depicted in two-dimensions for the sake of simplicity), the voxel frames of the CT images (representing the slices of the body-part), denoted with the reference 335, generally have a thickness that is lower than their distance (for example, voxel frames 335 with a thickness of 0.2 mm arranged in a regular pattern every 1 mm). Therefore, the voxel frames 335 are interpolated in order to obtain a (continuous) representation of the portion of interest of the body-part to be projected, which is defined by a projection solid 340 formed by the union (without any gaps) of the voxels corresponding to the areas of interest of the CT images, denoted with the reference 345.

In the solution according to an embodiment of the present disclosure, for this purpose a filling factor is calculated of each CT image according to an extent of the corresponding area of interest (for example, equal to a percentage of its cells). The voxel frames 335 are interpolated (to make them contiguous) by enlarging the voxel frames 335 according to the filling factors of the corresponding CT images, with the higher the filling factors the wider the voxel frames 335.

As a result, the voxel frames 335 of the CT images with the largest areas of interest mainly contribute to the definition of the projection solid 340; therefore, these CT images are given a major weight in the calculation of the simulated image. This significantly increases the accuracy of the simulated image (with beneficial effects on any diagnostic/therapeutic applications based thereon).

Moving to FIG. 4C (depicted in two-dimensions for the sake of simplicity), the X-ray radiation to be simulated for each pixel of the simulated image, denoted with the reference 350, is represented with a beam line 355 from a representation of the viewpoint (denoted with the same name and reference 315) to the pixel 350. The beam line 355 crosses one or more voxels of the projection solid 340; particularly, in the example at issue the beam line 355 crosses four voxels, denoted with the reference $335_1$, $335_2$, $335_3$ and $335_4$. The pixel value of the pixel 350 is calculated according to an average of the density of the portions of the body-part that are simulated to be crossed by the corresponding beam, weighed according to a path of the beam across them. For this purpose, a (crossing) length $P_1P_2$, $P_2P_3$, $P_3P_4$ and $P_4P_5$ is calculated of the beam line 355 in each voxel $335_1$, $335_2$, $335_3$ and $335_4$, respectively. The sum is calculated of the products of each crossing length $P_1P_2$-$P_4P_5$ by the voxel value of the corresponding voxel $335_1$-$335_4$; the pixel value of the pixel 350 is then set to this sum divided by a (total) length $P_1P_5$ of the beam line 355 in the whole projection solid 340.

Figure 5:
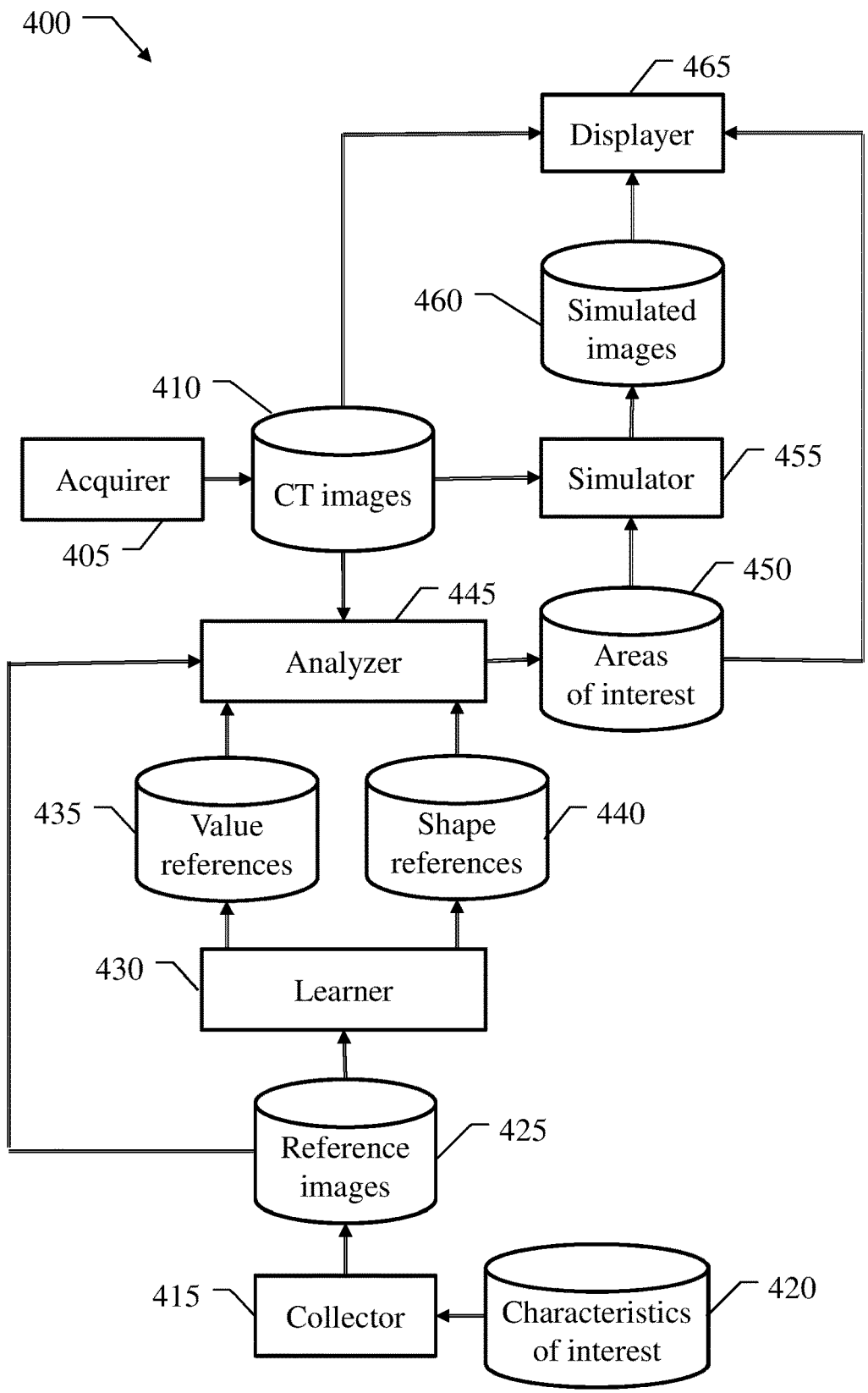
FIG. 5 shows the main software components that may be used to implement the solution according to an embodiment of the present disclosure.

With reference now to FIG. 5, the main software components are shown that may be used to implement the solution according to an embodiment of the present disclosure.

All the software components (programs and data) are denoted as a whole with the reference 400. The software components are typically stored in the mass memory and loaded (at least partially) into the working memory of the computer of the CT scanner when the programs are running. The programs are initially installed into the mass memory, for example, from removable storage units or from the network. In this respect, each program may be a module, segment or portion of code, which comprises one or more executable instructions for implementing the specified logical function.

Particularly, an acquirer 405 acquires the CT images of the body-part of the patient for each analysis; particularly, the acquirer 405 comprises (not shown in the figure) a register that registers the radiography images of the body-part and saves them into a corresponding repository and a modeler that reconstructs the CT images from the radiography images. The acquirer 405 accesses (in write mode) a CT image repository 410 storing the CT images (at least for the analysis that is in progress), each tagged with a unique identifier thereof (formed by a unique identifier of the analysis and a progressive number within it); the repository 410 of the CT images may also store descriptive information of each analysis (for example, a date of the analysis, a name of the patient, a mnemonic description).

A collector 415 collects one or more reference images of each characteristic of interest; for example, the characteristics of interest are known lesions (such as tumors, inflammations), specific organs (such as intervertebral discs, menisci) and the like. For this purpose, the collector 415 accesses (in read mode) a repository 420 storing a definition of known characteristics of interest (for example, downloaded periodically from the Internet or maintained manually); for each characteristic of interest, the repository 420 comprises a unique identifier and a mnemonic description thereof. Moreover, the collector 415 accesses (in write mode) a repository 425 storing the reference images. Each reference image is defined by a matrix of cells with the same size as the CT images containing corresponding voxel values; moreover, the reference image is tagged with a unique identifier thereof (formed by the identifier of the characteristic of interest that it represents and a progressive number within it).

A learner 430 (for example, based on a cognitive engine) learns the value references and the shape references (to be used for determining the areas of interest) from the reference images. For this purpose, the learner 430 accesses (in read mode) the repository 425 of the reference images. Moreover, the learner 430 accesses (in write mode) a repository 435 storing the value references and a repository 440 storing the shape references. For each characteristic of interest, the repository 435 of the value references comprises a distinguishing level (indicating the pixel value that best distinguishes the characteristic of interest) and a distinguishing range (indicating the pixel values around the distinguishing level that still distinguish the characteristic of interest even if to a lesser extent). For each characteristic of interest, the repository 440 of the shape references comprises a distinguishing geometry (or more), a distinguishing boundary (or more) and a distinguishing size (or more) that distinguish the characteristic of interest. The distinguishing geometry is defined by a sample figure, the distinguishing boundary is defined by a sample line and the distinguishing size is defined by a minimum extent. For example, the sample figure and the sample line are represented by corresponding matrixes of cells with the same size as the CT images; each cell contains a flag (i.e., a binary value) that is asserted (for example, at the logic value 1) when the corresponding location belongs to the sample figure/line or it is deasserted (for example, at the logic value 0) otherwise. The minimum extent is instead defined by a corresponding number of cells.

An analyzer 445 analyzes the (CT and reference) images to determine their areas of interest. For this purpose, the analyzer 445 accesses (in read mode) the repository 410 of the CT images, the repository 425 of the reference images, the repository 435 of the value references and the repository 440 of the shape references. Moreover, the analyzer 445 accesses (in write mode) a repository 450 storing a definition of the areas of interest of the CT/reference images. Particularly, each area of interest is defined by a matrix of cells with the same size as the CT/reference images; each cell contains a flag that is asserted when the cell is inside the area of interest or it is deasserted otherwise. Moreover, the area of interest is tagged with the identifier of the corresponding CT/reference image and the identifier of its characteristic of interest.

A simulator 455 simulates any desired simulated images for a corresponding analysis (representing projections of the body-part thereof, at least in part). For this purpose, the simulator 455 accesses (in read mode) the repository 410 of the CT images and the repository 450 of the areas of interest. Moreover, the simulator 455 accesses (in write mode) a repository 460 storing the simulated images; each simulated image is tagged with a unique identifier thereof (formed by the identifier of the corresponding analysis and a progressive number within it), the identifier of the characteristic of interest and descriptive information thereof (for example, a definition of the viewpoint, the projection plane and the projection square, a mnemonic description).

A displayer 465 displays (on the monitor of the computer of the CT scanner) a result of a corresponding analysis, and particularly its CT images (with or without corresponding areas of interest) and its possible simulated images. For this purpose, the displayer 465 accesses (in read mode) the repository 410 of the CT images, the repository 450 of the areas of interest and the repository 460 of the simulated images.

Figure 6A:
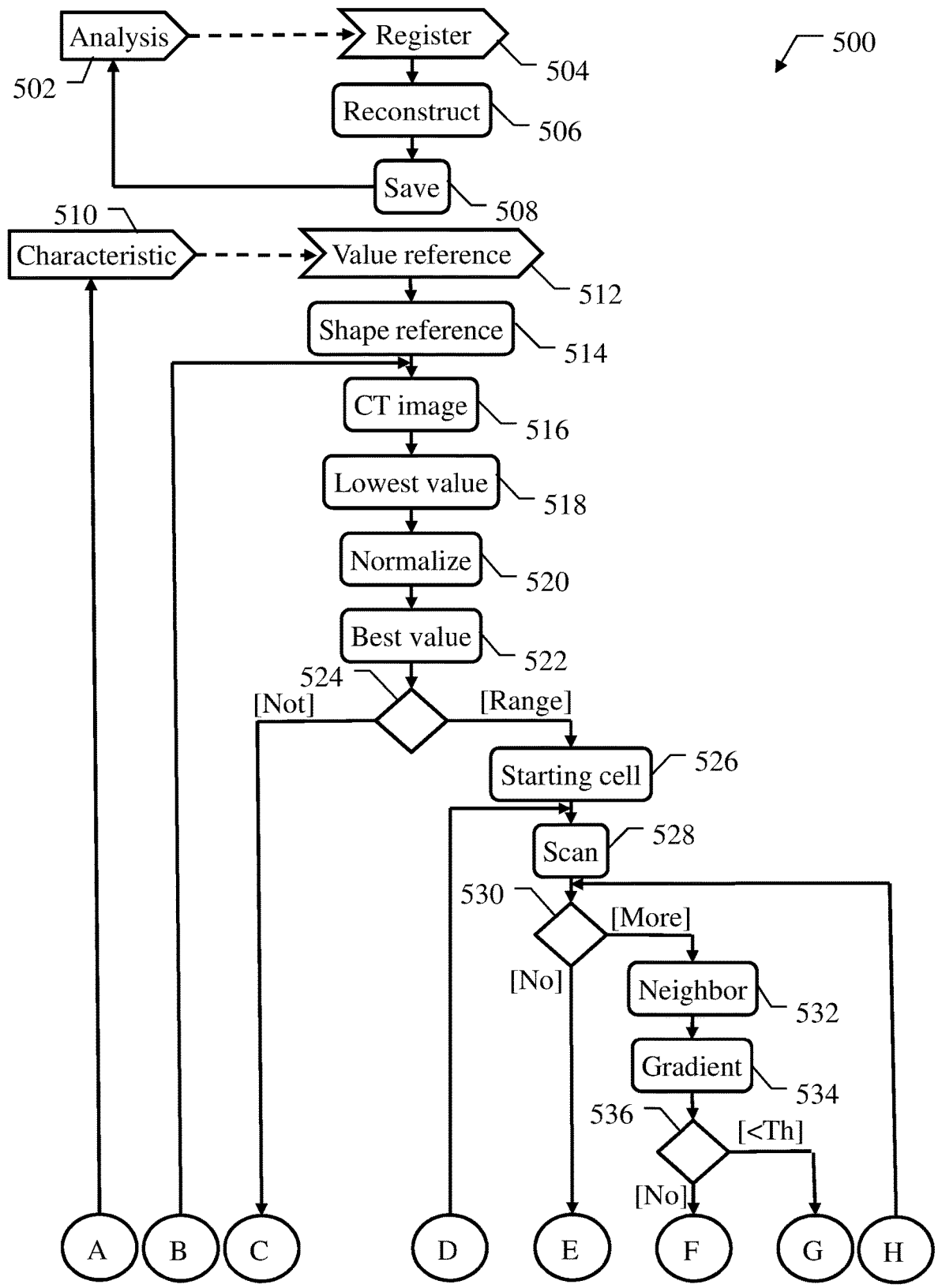
FIG. 6A-FIG. 6C show an activity diagram describing the flow of activities relating to an implementation of the solution according to an embodiment of the present disclosure.
Figure 6B:
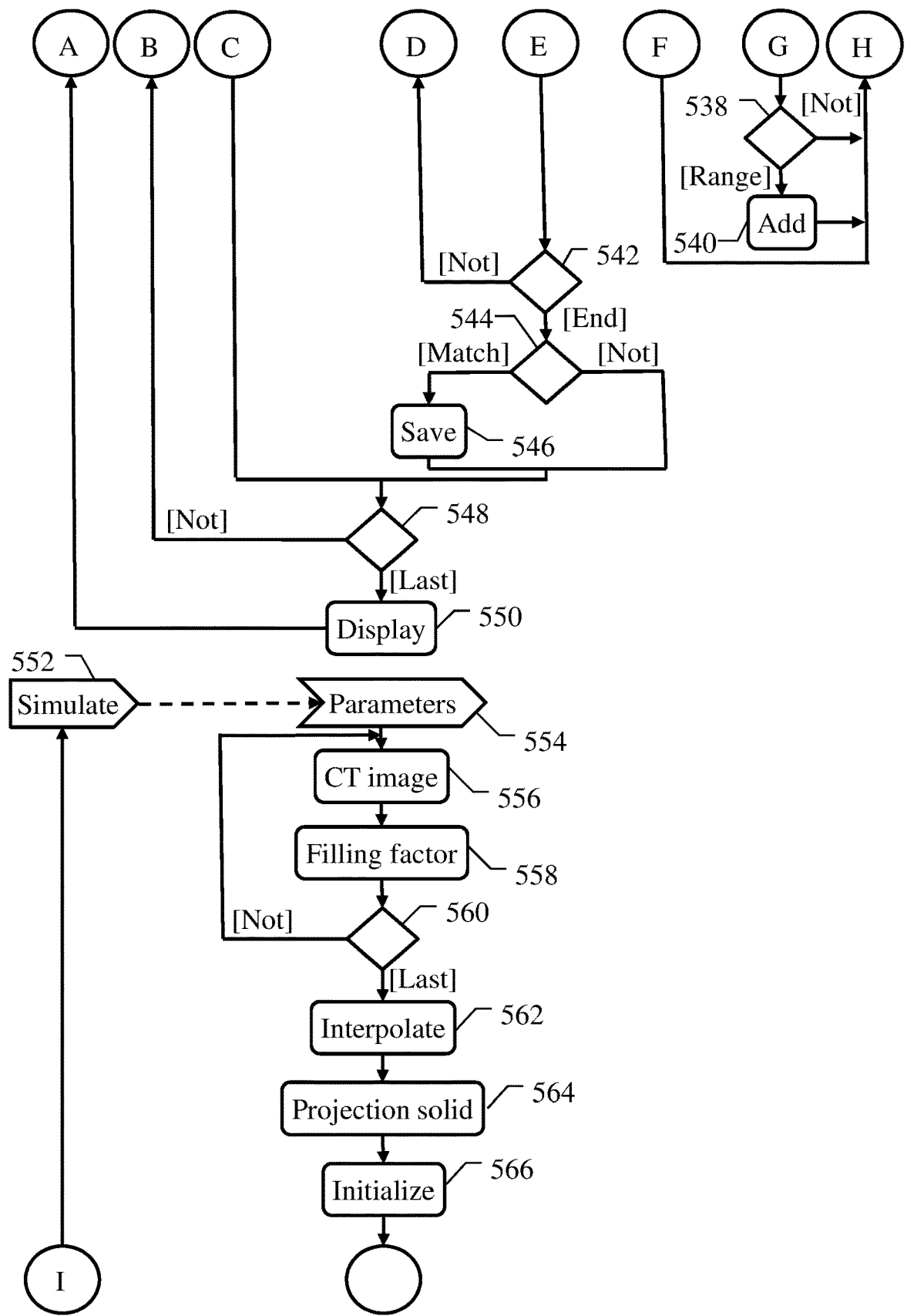
Figure 6C:
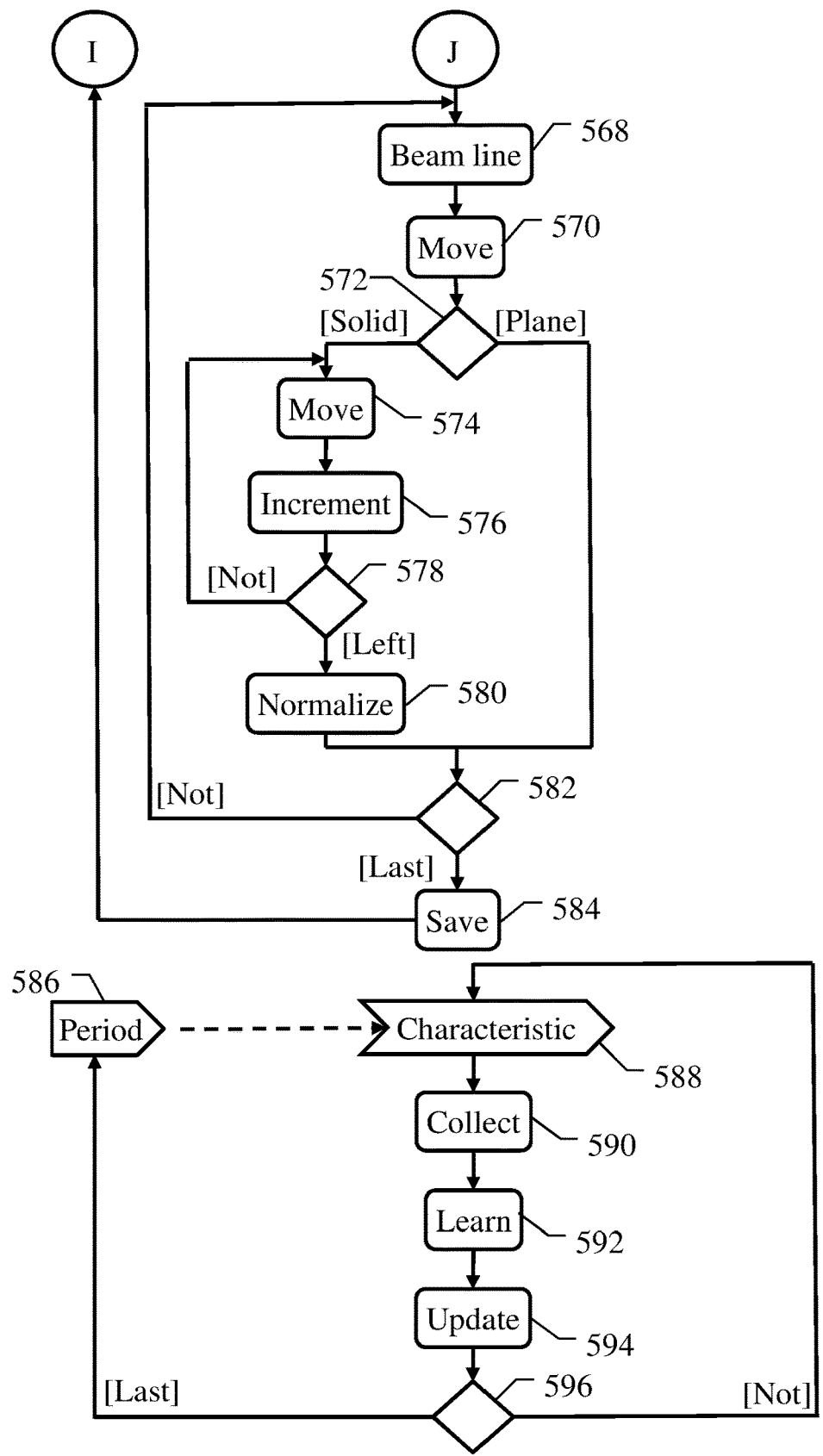

With reference now to FIG. 6A-FIG. 6C, an activity diagram is shown describing the flow of activities relating to an implementation of the solution according to an embodiment of the present disclosure.

Particularly, the diagram represents an exemplary process that may be used to analyze body-parts of patients with a method 500. In this respect, each block may correspond to one or more executable instructions for implementing the specified logical function on the server.

The process passes from block 502 to block 504 every time a (new) analysis of a body-part of a patient is to be performed with the CT scanner. In this phase, a healthcare assistant lets the patient lay down onto the table (extracted from the gantry); if necessary, the healthcare assistant administers a contrast agent (for example, an iodine-based substance) to the patient (for example, by injection) for highlighting specific structures of the body-part to be analyzed. The healthcare assistant then enters (via a user interface of the acquirer) the descriptive information of the analysis (i.e., the name of the patient and its mnemonic description, with the current date that is added automatically), which descriptive information is saved (together with a new identifier of the analysis) into the repository of the CT images. The healthcare assistant then actuates the CT scanner to cause the table to slide into the gantry, until the body-part reaches a proper position within its opening; at this point, the healthcare assistant causes the register of the acquirer to register the radiography images of the body-part (representing its spiral scan along the longitudinal axis of the patient). Continuing to block 506, once the scanning of the body-part has been completed, the table returns out the gantry so that the patient may be let to get off it; at the same time, the modeler of the acquirer reconstructs the CT images from the radiography images. The modeler at block 508 saves the CT images so obtained (tagged with their identifier formed by the identifier of the analysis and new progressive numbers thereof) into the corresponding repository; in this phase, the displayer may also display at least part of the CT images selected by a physician (for example, to verify the effectiveness of the scan and possibility repeat it whether a corresponding quality is too poor). The process then returns to the block 502 waiting for a further analysis to be performed.

The process now passes from block 510 to block 512 every time the physician wishes to examine the body-part of a specific analysis (typically, the last one) against a characteristic of interest (for example, a suspected lesion to be searched or a pre-existing lesion to be monitored), which characteristic of interest is selected among the ones defined in the corresponding repository (via a user interface of the analyzer); in response thereto, the analyzer retrieves the selected value reference of the selected characteristic of interest from the corresponding repository. Likewise, the analyzer at block 514 retrieves the selected shape reference of the selected characteristic of interest from the corresponding repository.

A loop is then entered for processing the CT images of the body-part. The loop begins at block 516, wherein the analyzer takes a (current) CT image into account (starting from a first one in any arbitrary order). The analyzer at block 518 scans the CT image to identify its cell with the lowest voxel value. The analyzer at block 520 normalizes the CT image with respect to a baseline value (for example, retrieved from a corresponding configuration variable); the baseline value represents a pre-defined zero level corresponding to no attenuation of the X-ray radiation (black). For this purpose, the analyzer reduces every voxel value of the CT image by a difference between its lowest value and the baseline value. In this way, the CT image is referred to the baseline value, so as to make it independent of the CT scanner and its configuration (and then comparable with any other images).

A possible candidate area (which might represent a portion of the body-part with the selected characteristic of interest) is identified in the CT image. For this purpose, the analyzer at block 522 scans the (normalized) CT image to identify its (best) cell with the voxel value that best matches the distinguishing level indicated in the value reference (i.e., it is closest thereto). A test is performed at block 524, wherein the analyzer verifies whether the voxel value of the best cell is within the distinguishing range indicated in the value reference. If so, the best cell defines the starting cell of the candidate area; therefore, the analyzer at block 526 initializes the candidate area (formed by a matrix of cells with the same size as the CT images each one containing a flag that is asserted when the cell is inside the candidate area or it is deasserted otherwise) by asserting the flag of the starting cell, with the flags of all the other cells that are deasserted.

A further loop is then entered for enlarging the candidate area. The loop begins at block 528, wherein the analyzer takes an (enlarging) cell of the CT image into account; the enlarging cell is extracted (starting from a first one in any arbitrary order) from an enlarging list indicating the cells of the CT images along which the candidate area may be enlarged (initialized to the starting cell). At the same time, the enlarging cell is removed from the enlarging list and it is added to a scanned list indicating the cells of the CT images that have already been scanned for this purpose (initially empty). A test is made at block 530, wherein the analyzer verifies whether any (neighbor) cell of the enlarging cell is still to be processed; the neighbor cells are the cells of the CT image that are adjacent to the enlarging cell along any direction (i.e., vertically, horizontally and diagonally) and that have not already been scanned (as indicated by the scanned list). If so, the analyzer at block 532 takes a (current) neighbor cell still to be processed into account (starting from a first one in any arbitrary order). The analyzer at block 534 calculates a gradient of the voxel values from the enlarging cell to the neighbor cell (i.e., their difference). The flow of activity branches at block 536 according to this gradient. Particularly, if the gradient is (possibly strictly) lower than a variation threshold (for example, 10-20% of the pixel value of the current cell) the analyzer at block 538 verifies whether the voxel value of the neighbor cell is still within the distinguishing range indicated in the value reference. If so, the analyzer at block 540 adds the neighbor cell to the candidate area by asserting its flag; at the same time, the analyzer adds the neighbor cell to the enlarging list (to continue enlarging the candidate area along it). The flow of activity then returns to the block 530 from the block 540 or directly from the block 536 (when the gradient is, possibly strictly, higher than the variation threshold) or from the block 538 (when the voxel value of the neighbor cell is outside the distinguishing range). With reference again to the block 530, as soon as no neighbor cell remains to be processed (always true when all the cells adjacent to the enlarging cell have already been scanned), the corresponding loop is exit by descending into block 542; at this point, the analyzer verifies whether the candidate area may still be enlarged (i.e., any cell remains in the enlarging list). If so, the flow of activity returns to the block 528 to repeat the same operations for a next enlarging cell.

Conversely, once the candidate area may not be enlarged any longer (i.e., the enlarging list is empty) the corresponding loop is exit by descending into block 544; at this point, the analyzer verifies whether the cells of the candidate area match the shape reference. For this purpose, the analyzer verifies whether a geometry of the candidate area matches the distinguishing geometry indicated in the shape reference; for example, this happens when a measure of a difference between the candidate area and the sample figure of the distinguishing geometry (for example, calculated according to cognitive techniques) is, possibly strictly, lower than a corresponding threshold (for example, 10-20%). Moreover, the analyzer verifies whether a boundary of the candidate area matches the distinguishing boundary indicated in the shape reference; for example, this happens when a measure of a difference between a contour of the candidate area and the sample line of the distinguishing geometry (for example, again calculated according to cognitive techniques) is, possibly strictly, lower than a corresponding threshold (for example, 10-20%). At the end, the analyzer verifies whether a size of the candidate area matches the distinguishing size indicated in the shape reference; for example, this happens when the number of cells of the candidate area is, possibly strictly, higher than the minimum extent of the distinguishing size. When the cells of the candidate area match the shape reference, the candidate area is identified as an area of interest; therefore, the analyzer at block 546 saves the area of interest (tagged with the identifier of the CT image and the identifier of the selected characteristic of interest) into the corresponding repository. The flow of activity then descends into block 548; the same point is also reached directly from the block 524 (when the voxel value of the best cell is outside the distinguishing range indicated in the value reference) or from the block 544 (when the cells of the candidate area do not match the share reference) without performing any action since no region of interest is present in the CT image.

At this point, the analyzer verifies whether a last CT image has been processed. If not, the flow of activity returns to block 516 to repeat the same operations on a next CT image. Conversely (once all the CT images have been processed), the corresponding loop is exit by descending into block 550; the displayer now displays at least part of the CT images selected by the physician with any corresponding areas of interest thereof that are highlighted. For example, the cells of each area of interest are rendered according to a given color-map palette, such as in a same color with brightness lighter as a distance of the corresponding voxel values from the distinguishing value increases; this significantly facilitates the identification and the quantification of the corresponding portion of interest of the body-part. Moreover, this representation in color of the area of interest is superimposed onto the representation in grey scale of the rest of the corresponding body-part; this allows contextualizing the portion of interest of the body-part within its anatomical representation. The process then returns to the block 510 waiting for a further analysis to be performed.

The process passes from block 552 to block 554 every time the physician wishes to obtain any simulated image of a portion of interest of the body-part (from a different viewpoint with respect to the CT images); for this purpose, the physician enters the parameters defining the simulated image, i.e., the viewpoint, the projection plane, the projection square, the characteristic of interest defining the portion of interest and its mnemonic description (via a user interface of the simulator).

A loop is then entered for interpolating the slices of the CT images. The loop begins at block 556, wherein the simulator takes a (current) CT image into account (starting from a first one in any arbitrary order). The simulator at block 558 calculates the filling factor of the CT image; for example, the filling factor is set to the number of the cells of the CT image belonging to the area of interest representing the portion of interest (i.e., whose flags are asserted) divided by a total number of the cells of the CT image. The simulator at block 560 verifies whether a last CT image has been processed. If not, the flow of activity returns to block 556 to repeat the same operations on a next CT image. Conversely (once all the CT images have been processed), the corresponding loop is exit by descending into block 562; at this point, the simulator interpolates the voxel frames of the CT images according to their filling factors. Particularly, the gap between each pair of adjacent voxel frames is filled by enlarging them proportionally to the filling factors of the corresponding CT images; for example, a gap of 1 mm between two voxel frames of CT images having the filling factors equal to 5% and 40% is filled by enlarging them by 5*1/(5+40)=0.11 mm and 40*1/(5+40)=0.89 mm, respectively. As a result, the simulator at block 564 defines the projection solid (representing the portion of interest of the body-part to be projected) as the union of the (enlarged) voxels of the areas of interest of the CT images.

The simulator at block 566 initializes the simulated image. For this purpose, the simulator determines a footprint of the projection of the projection solid onto the projection plane, as defined by (edge) lines from the viewpoint to a center of each (edge) voxel at the edge of the projection solid. The simulator defines the projection square as the smallest one surrounding the intersection of the edge lines with the projection plane; the simulator determines the pixels of the simulated image (by dividing the projection square according to its number of rows and columns) and initializes them to the baseline value.

A loop is then entered for processing the pixels of the simulated image. The loop begins at block 568, wherein the analyzer takes a (current) pixel of the simulated image into account (starting from a first one in any arbitrary order). The simulator then determines the corresponding beam line from the viewpoint to a center of the pixel; the beam line is defined (in a Cartesian space with coordinates x, y and z along corresponding axes X, Y and Z) by the following parametric equations:

$$x=c_x d+V_x \qquad \text{(equation 1)}$$

$$y=c_y d+V_y \qquad \text{(equation 2)}$$

$$z=c_z d+V_z, \qquad \text{(equation 3)}$$

wherein $c_x$, $c_y$ and $c_z$ are the director cosines of the beam line with respect to the axes X, Y and Z, respectively, $d \geq 0$ is a distance from the viewpoint along the beam line and $V_x$, $V_y$ and $V_z$ are the coordinates of the viewpoint. The simulator at block 570 moves along the beam line from the viewpoint (by increasing the distance d) until reaching the projection solid or the projection plane. The flow of activity then branches at block 572 according to a result of the movement. Particularly, if the projection solid has been reached (meaning that the beam line crosses it), a further loop is entered for scanning the beam line along the projection solid. The loop begins at block 574, wherein the simulator further moves along the beam line away from the viewpoint (by increasing the distance d) until passing to a next voxel of the projection solid or leaving it. The simulator at block 576 increments the corresponding pixel value by a product of the voxel value of the voxel that has been crossed by the length of the beam line along it. The simulator at block 578 verifies whether the beam line left the projection solid (meaning that is has been completely crossed). If not, the flow of activity returns to the block 574 to continue the scanning along the beam line. Conversely, as soon as the projection solid has been left the corresponding loop is exit by descending into block 580; at this point, the simulator normalizes the pixel value dividing it by the (total) length of the beam line across the whole projection solid (i.e., from the entry into its first voxel to the exit from its last voxel). The process then continues to block 582; the same point is also reached directly from the block 572 when the projection plane has been reached (meaning that the beam line does not cross the projection solid), so as to leave the corresponding pixel value equal to the baseline value. In any case, the simulator now verifies whether a last beam line has been processed. If not, the flow of activity returns to block 568 to repeat the same operations on a next beam line. Conversely (once all the beam lines have been processed), the corresponding loop is exit by descending into block 584. At this point, the simulator saves the simulated image so obtained (tagged with its identifier formed by the identifier of the analysis and a new progressive number thereof) into the corresponding repository; at the same time, the displayer displays the simulated image (either in grey scale or colored as above). The process then returns to the block 552 waiting for a further request of a simulated image.

In a completely independent way, the process passes from block 586 to block 588 as soon as a refreshing period expires (for example, every 1-7 days). In response thereto, a loop is entered for refreshing the value/shape references of the characteristics of interest; the loop begins with the collector that takes a (current) characteristic of interest into account (from a first one in any arbitrary order, as indicated in the corresponding repository). The collector at block 590 collects any (new) reference images relating to the characteristic of interest that have been published after a last collection thereof (for example, as indicated by its date stored in a corresponding variable after the last collection has been completed); for example, the reference images are collected locally (such as by extracting them from a database of a corresponding organization, like a hospital) and/or remotely (such as by downloading them from medical/research web sites). The collector pre-processes each reference image that has been collected to make it comparable with the CT images. Particularly, the collector resizes the reference image to the size of the CT images (by subsampling or by interpolating the reference image when it is bigger or smaller, respectively); moreover, the collector normalizes the reference image with respect to the baseline value as above. The collector then saves the (pre-processed) reference images (tagged with their identifier formed by the identifier of the characteristic of interest and new progressive numbers thereof) into the corresponding repository. The learner at block 592 analyzes each reference image that has been collected to determine the area of interest of its characteristic of interest as above; the learner saves the definition of the area of interest into the corresponding repository (tagged with the identifier of the reference image and the identifier of the characteristic of interest). The learner then applies cognitive techniques to infer the value reference and the shape reference of the characteristic of interest from all the reference images thereof. The learner at block 594 updates the value reference and the shape reference of the characteristic of interest accordingly into the corresponding repositories. A test is now made at block 596, wherein the learner verifies whether a last characteristic of interest has been processed. If not, the flow of activity returns to the block 588 to repeat the same operations on a next characteristic of interest. Conversely (once all the characteristics of interest have been processed), the corresponding loop is exit by returning to the block 586 waiting for a next expiration of the refreshing period.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for analyzing an object. However, the object may be of any type (for example, body-parts, machines, structural components, luggage and so on) and it may be analyzed for any purpose (for example, for detecting/treating lesions of body-parts, for reverse-engineering machines, for detecting flaws/failures of structural components, for finding drugs/weapons/explosives in luggage).

In an embodiment, the method comprises providing (to a computing system) one or more input images of the object. However, the computing system may be of any type (for example, a scanner, a distinct computer); moreover, the input images may be provided to the computing system in any number and in any way (for example, acquired directly by the computing system or by another device and then transferred to the computing system for its processing, such as through removable storage units or the network).

In an embodiment, each of the input images comprises a plurality of input cells containing corresponding input values that provide corresponding representations of locations of the object. However, each input image may have any size and shape (from its whole matrix to one or more selected portions thereof); moreover, the input values may represent any type of locations of the object (for example, voxels, pixels or groups thereof) in any way (for example, in grey-scale or color). In any case, the input images may have been acquired in any way (for example, with CT, MRI, ultrasound scans) and they may be used as-is or pre-processed in any way (for example, to compensate motion artifacts, to subtract a background image, to smooth them and the like).

In an embodiment, the method comprises retrieving (by the computing system, from one or more value references for corresponding characteristics of interest stored in a memory of the computing system) a selected one of the value references for a selected one of the characteristics of interest. However, the characteristics of interest may be in any number and of any type (for example, lesions, organs, components, cracks, materials) and each value reference may be defined by one or more elements providing any quantitative measure that may be used to distinguish the corresponding characteristic of interest (for example, level, range, average, tolerance). The value references may be stored in any way (for example, locally or remotely); the selected characteristic of interest may be determined in any way (for example, manually or automatically) and the corresponding selected value reference may be retrieved in any way (for example, by submitting a query or a download request).

In an embodiment, the method comprises retrieving (by the computing system, from one or more corresponding shape references for the characteristics of interest stored in the memory of the computing system) a selected one of the shape references for the selected characteristic of interest. However, each shape reference may be defined by one or more elements providing any qualitative/quantitative definition of an appearance that may be used to distinguish the corresponding characteristic of interest (for example, partial, different and/or additional elements with respect to the ones mentioned above); the shape references may be stored in any way (together or separate from the value references) and the selected shape reference may be retrieved in any way (either the same or different with respect to the selected value reference).

In an embodiment, the method comprises identifying (by the computing system) one or more candidate areas of each of the input images. However, the candidate areas may be identified in any number for any of the input images (from all the input images to one or more selected input images).

In an embodiment, each of the candidate areas is identified according to the corresponding input values matching the selected value reference. However, the candidate areas may be identified in any way (for example, by identifying their starting cells and then enlarging the candidate areas as far as possible, by filtering the input image according to the value reference and then aggregating the filtered cells).

In an embodiment, the method comprises identifying (by the computing system) one or more of the candidate areas as areas of interest. However, the areas of interest may be identified in any number for each input image (from all the candidate areas fulfilling the corresponding criteria to one or more candidate areas better doing it).

In an embodiment, each of the areas of interest is identified according to the corresponding input cells matching the selected shape reference. However, the areas of interest may be identified in any way (for example, by applying cognitive techniques, fuzzy logic techniques, the Procrustes analysis and the like).

In an embodiment, the method comprises storing (by the computing system) an indication of the areas of interest into the memory of the computing system for use in analyzing the object. However, the areas of interest may be stored in any way (together or separate from the corresponding input images) and in any memory (for example, mass memory, working memory, either locally or remotely); the areas of interest may be used for analyzing the object in any way (for example, visual inspection, projection of portions thereof, calculation of one or more parameters characterizing the areas of interest, such as any statistical indicators of their input values).

In an embodiment, the object is a body-part of a patient. However, the body-part may be of any type (for example, organ, region or tissue) of any patient (for example, person or animal).

In an embodiment, the method comprises outputting by the computing system selected one or more of the input images. However, the input images may be selected in any number and in any way (for example, manually or automatically); moreover, the selected input images may be output in any way (for example, displayed, printed either locally or remotely).

In an embodiment, the selected input images are output with the corresponding areas of interest that are highlighted. However, the areas of interest may be highlighted in any way (for example, by a single color with different brightness, by different colors, by a single color and brightness, by any other visual cue such as a circle or even alone with all the other input values that are reset to the baseline value).

In an embodiment, the input images are a plurality of input images acquired with a computed tomography scanner. In some embodiments, the input images provide representations of slices of the object. However, the input images may be acquired in any number with any computed tomography scanner (for example, of X-ray, PET, SPECT type).

In an embodiment, the input images provide corresponding representations of slices of the object. However, the slices may be in any number and they may have any extent and arrangement (either spaced apart or contiguous to each other).

In an embodiment, the method comprises calculating (by the computing system) a simulated image simulating an effect onto a projection plan of a radiation that is applied to a portion of interest of the object represented by a projection solid corresponding to the areas of interest. However, the simulated image may relate to any projection plan (for example, orthogonal or oblique to the slices, curved); in any case, the possibility of projecting a different portion of the object (for example, selected manually) or the whole object is not excluded.

In an embodiment, the method comprises outputting (by the computing system) the simulated image. However, the simulated image may be output in any way (either the same or different with respect to the input images).

In an embodiment, said step of calculating (by the computing system) a simulated image comprises defining (by the computing system) the simulated image to comprise a plurality of simulated cells (for corresponding simulated values) according to the projection solid. However, the simulated image may be defined in any way (for example, by determining the edge lines from the viewpoint to the edge of the projection solid or by moving around a line from the viewpoint perpendicular to the projection plane until reaching the edge of the projection solid).

In an embodiment, said step of calculating (by the computing system) a simulated image comprises determining (by the computing system) corresponding beam lines for the simulated cells that simulate the effect of the radiation onto a corresponding area of the projection plane. However, the beam lines may be determined in any way (for example, by representing them with any formalism).

In an embodiment, said step of calculating (by the computing system) a simulated image comprises calculating (by the computing system) the simulated values each according to a path of the corresponding beam line along each representation of the locations that is crossed by the beam line and according to the corresponding input value. However, each simulated value may be calculated in any way (for example, with or without normalizing it according to the total path of the beam line across the projection solid).

In an embodiment, the representations of the slices are spaced apart to each other. However, the representations of the slices may be spaced apart by any distance; this may be due either to the input images as originally provided or after a sub-sampling thereof for the projection.

In an embodiment, said step of calculating (by the computing system) a simulated image comprises calculating (by the computing system) corresponding filling factors of the input images according to an extent of the corresponding areas of interest. However, the filling factors may be calculated in any way (for example, simply according to the number of input cells of the areas of interest or by taking into account their input values as well).

In an embodiment, said step of calculating (by the computing system) a simulated image comprises interpolating (by the computing system) the representations of the slices (to make the representations of the slices adjacent to each other) by enlarging the representations of the slices according to the corresponding filling factors. However, the representations of the slices may be enlarged in any way according to the corresponding filling factors (either linearly or non-linearly). In any case, the possibility is not excluded of enlarging the representations of the slices uniformly; conversely, this feature may be implemented independently of how the areas of interest are identified (comprised when this is performed in a standard way, such as manually).

In an embodiment, the method comprises retrieving (by the computing system) a baseline value (to which the value references are referred) from the memory of the computing system. However, the baseline value may be defined in any way (for example, globally for all the input images or individually for each characteristic of interest) and it may be stored and retrieved in any way (either the same or different with respect to the value/shape references).

In an embodiment, the method comprises identifying (by the computing system) a limit value of the input values of each of the input images. However, the limit value may be identified in any way (for example, set to the lowest/highest input value, an average of two or more lower/higher input values).

In an embodiment, the method comprises normalizing (by the computing system) each of the input images according to a comparison between the corresponding limit value and the baseline value. However, each input image may be normalized in any way (for example, with a simple subtraction or with more complex filters); in any case, this step may also be omitted at all (for example, when all the input images are acquired with uniform conditions).

In an embodiment, said step of identifying (by the computing system) one or more candidate areas of each of the input images comprises scanning (by the computing system) the input cells of the input image to identify corresponding starting cells of the candidate areas according to a comparison of the input values with the value reference. However, the starting cells may be identified in any way (for example, corresponding to the best input value only, to two or more better input values, proposing possible choices for their manual selection).

In an embodiment, said step of identifying (by the computing system) one or more candidate areas of each of the input images comprises initializing by the computing system the candidate areas to the corresponding starting cells. However, each candidate area may be initialized in any way (for example, only to the starting cell or to a neighborhood thereof).

In an embodiment, said step of identifying (by the computing system) one or more candidate areas of each of the input images comprises enlarging (by the computing system) each of the candidate areas according to a comparison of the input values of the input cells moving along a plurality of enlarging directions irradiating from the corresponding starting cell in the input image. However, each candidate area may be enlarged along any number of enlarging directions in any way (for example, according to their variation, their matching the value reference or any combination thereof).

In an embodiment, said step of identifying (by the computing system) one or more candidate areas of each of the input images comprises scanning (by the computing system) the input cells of the input image to identify the starting cells of the candidate areas as corresponding to the input values best matching a distinguishing level indicated in the value reference. However, the input values that best match the distinguishing level may be determined in any way (for example, according to each input value individually or to each input value mediated according to the input values of its surrounding cells).

In an embodiment, said step of identifying (by the computing system) one or more candidate areas of each of the input images comprises enlarging (by the computing system) each of the candidate areas by moving along each of the enlarging directions until a variation of the corresponding input values is within a variation threshold and the input values remain within a distinguishing range around the distinguishing level indicated in the value reference. However, the movement along each enlarging direction may be stopped in any way (for example, as soon as one or both of these conditions are not fulfilled or after this happens for two or more consecutive input cells).

In an embodiment, said step of identifying (by the computing system) one or more of the candidate areas as areas of interest comprises identifying (by the computing system) the areas of interest according to a comparison of a geometry, a boundary and/or a size of the candidate areas with a distinguishing geometry, a distinguishing boundary and/or a distinguishing size, respectively, indicated in the shape reference. However, the distinguishing geometry and the distinguishing boundary may be defined in any way (for example, by a sample figure and a sample line, respectively, together by a representative image, by corresponding features such as linear, jagged) and their match may be determined in any way (for example, when a corresponding measure of difference or confidence factor reaches a threshold); likewise, the distinguishing size may be defined in any way (for example, by a minimum and/or a maximum extent defined simply according to the number of input cells or by taking into account their input values as well) and its match may be determined in any way (for example, with or without a predefined tolerance).

In an embodiment, the method comprises collecting (by the computing system) one or more reference images for each of the characteristics of interest. However, the reference images may be collected in any way (for example, locally and/or remotely, in push or pull mode from partial, different and/or additional sources with respect to the ones mentioned above).

In an embodiment, the method comprises determining (by the computing system) the value reference and the shape reference for each of the characteristics of interest according to the corresponding reference images. However, the value/shape references may be determined in any way (for example, with cognitive techniques, neural networks, and the like).

In an embodiment, the method comprises storing (by the computing system) the value reference and the shape reference for each of the characteristics of interest into the memory of the computing system. However, the value/shape references may be updated in any way (for example, always or only when they remain stable for a predefined period); in any case, the possibility is not excluded of defining the value/shape references in a different way (for example, with a human confirmation or even completely manually).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

In any case, the above-described (data-processing) method may be implemented independently of any interaction with the patient (and particularly with any contrast agent that may be pre-administered thereto before performing the method). Although the data-processing method may facilitate the task of a physician, it only provides intermediate results that may help him/her in examining the body-part (for example, for diagnostic purposes) but with the diagnosis for curative purposes stricto sensu (i.e., the examination phase with the collection of data, the comparison of the data with standard values, the finding of any significant deviation and the attribution of such deviation to a clinical picture) that is always made by the physician himself/herself.

An embodiment provides a computer program that is configured for causing a computing system to perform the above-mentioned method. An embodiment provides a computer program product, the computer program product comprising a computer readable storage medium having program instructions embodied therewith, the program instructions readable by a computing system to cause the computing system to perform the same method. However, the software program may be implemented as a stand-alone module, as a plug-in for a pre-existing software program (for example, a control program of the CT scanner), or even directly in the latter. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may comprise any number and type of computing machines (for example, a scanner, a scanner with a computer, a distinct computer) and it may have any architecture (stand-alone or distributed with the computing machines communicating among them via any local, wide area, global, cellular or satellite network and exploiting any type of wired and/or wireless connections).

In an embodiment, the system comprises a computed tomography scanner. However, the scanner may be of any type (see above).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a diagnostic method. The diagnostic method comprises acquiring one or more input images of a body-part of a patient, each of the input images comprising a plurality of input cells containing corresponding input values providing corresponding representations of corresponding locations of the body-part. The input images are processed by a computing system to retrieve, from one or more value references for corresponding characteristics of interest stored in a memory of the computing system, a selected one of the value references for a selected one of the characteristics of interest, to retrieve, from one or more corresponding shape references for the characteristics of interest stored in the memory of the computing system, a selected one of the shape references for the selected characteristic of interest, to identify one or more candidate areas of each of the input images, each of the candidate areas being identified according to the corresponding input values matching the selected value reference, to identify one or more of the candidate areas as areas of interest, each of the areas of interest being identified according to the corresponding input cells matching the selected shape reference, and to store an indication of the areas of interest into the memory of the computing system. The diagnostic method comprises evaluating a health condition of the body-part according to the areas of interest.

The method may find application in any kind of diagnostic applications (in the broadest meaning of the term, for example, aimed at either discovering new lesions or monitoring known lesions) and for analyzing any kind of body-part of any patient (see above).

An embodiment provides a therapeutic method. The therapeutic method comprises acquiring one or more input images of a body-part of a patient, each of the input images comprising a plurality of input cells containing corresponding input values providing corresponding representations of corresponding locations of the body-part. The input images are processed by a computing system to retrieve, from one or more value references for corresponding characteristics of interest stored in a memory of the computing system, a selected one of the value references for a selected one of the characteristics of interest, to retrieve, from one or more corresponding shape references for the characteristics of interest stored in the memory of the computing system, a selected one of the shape references for the selected characteristic of interest, to identify one or more candidate areas of each of the input images, each of the candidate areas being identified according to the corresponding input values matching the selected value reference, to identify one or more of the candidate areas as areas of interest, each of the areas of interest being identified according to the corresponding input cells matching the selected shape reference, and to store an indication of the areas of interest into the memory of the computing system. The therapeutic method comprises determining a therapy for the body-part according to the areas of interest. The therapeutic method comprises applying the therapy to the patient.

In an embodiment, the therapeutic method comprises acquiring a plurality of said input images with a computed tomography scanner to provide corresponding representations of slices of the body-part. The input images are processed by the computing system to calculate a simulated image simulating an effect onto a projection plan of a radiation applied to a portion of interest of the object represented by a projection solid corresponding to the areas of interest and to output the simulated image. The therapeutic method comprises controlling the application of the radiation to the body-part according to the simulated image.

The method may find application in any kind of therapeutic applications (in the broadest meaning of the term, for example, aimed at curing a pathological condition, at avoiding its progress, at preventing the occurrence of a pathological condition, or simply at ameliorating a comfort of the patient) and for treating anybody-part of any patient (see above).

Figure 7:
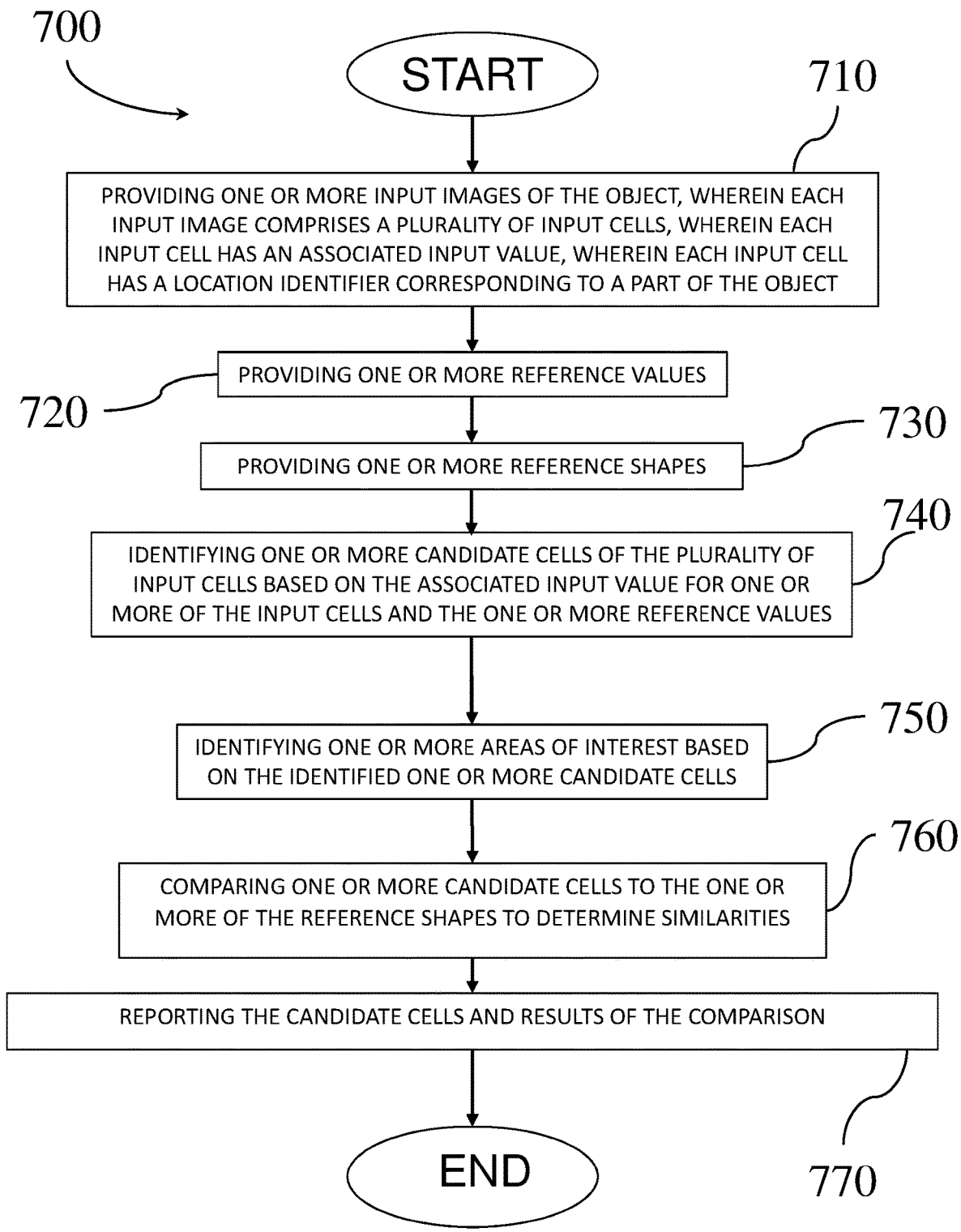
FIG. 7 is a flow diagram illustrating a process for identification of areas of interest in imaging applications according to an embodiment of the present disclosure.

FIG. 7 is a flow diagram illustrating a process for identification of areas of interest in imaging applications according to an embodiment of the present disclosure. Process 700 begins with the providing, to data receiving module 20, one or more input images 12 of the object, wherein each input image comprises a plurality of input cells, wherein each input cell has an associated input value, wherein each input cell has a location identifier corresponding to a part of the object. This is illustrated at step 710. In some embodiments, data receiving module 20 is also provided with one or more reference values 14. This is illustrated at step 720. In some embodiments, data receiving module 20 is also provided with one or more reference shapes 16. This is illustrated at step 730. In some embodiments, cell identifier identifies 25 one or more candidate cells of the plurality of input cells based on the associated input value for one or more of the input cells and reference value 14. This is illustrated at step 740. In some embodiments, the cell identifier identifies one or more areas of interest based on the identified one or more candidate cells. This is illustrated at step 750. In some embodiments, the comparison engine compares one or more candidate cells to the one or more of the reference shapes to determine similarities. This is illustrated at step 760. In some embodiment, the reporting engine reports the candidate cells and results of the comparison. This is illustrated at step 770.

Computer System

Figure 8:
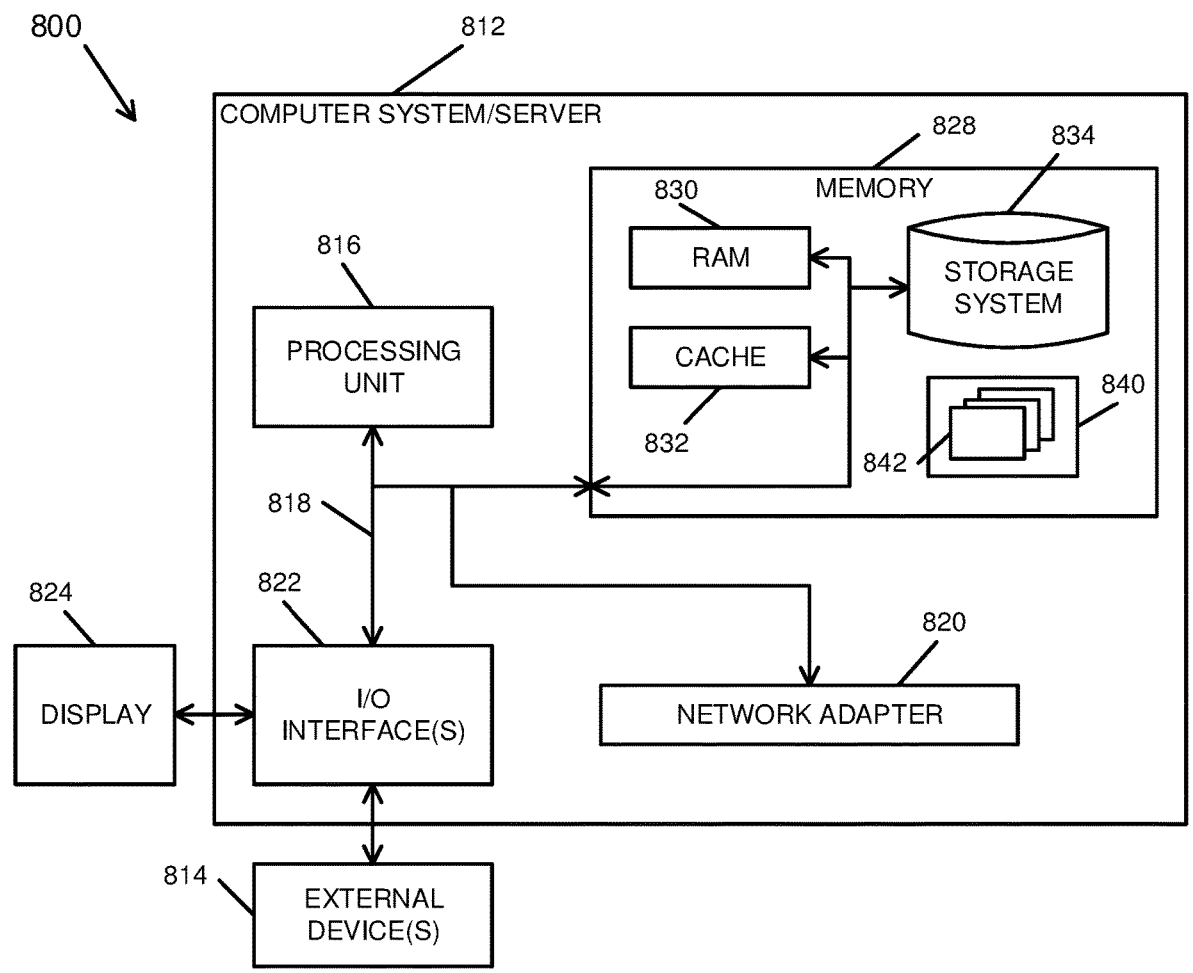
FIG. 8 depicts a computer system in accordance with an exemplary embodiment of the present disclosure.

In an exemplary embodiment, the computer system is a computer system 800 as shown in FIG. 8. Computer system 800 is only one example of a computer system and is not intended to suggest any limitation as to the scope of use or functionality of embodiments of the present disclosure. Regardless, computer system 800 is capable of being implemented to perform and/or performing any of the functionality/steps of the present disclosure.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/steps of embodiments of the disclosure.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present disclosure.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components can be used in conjunction with computer system/server 812. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
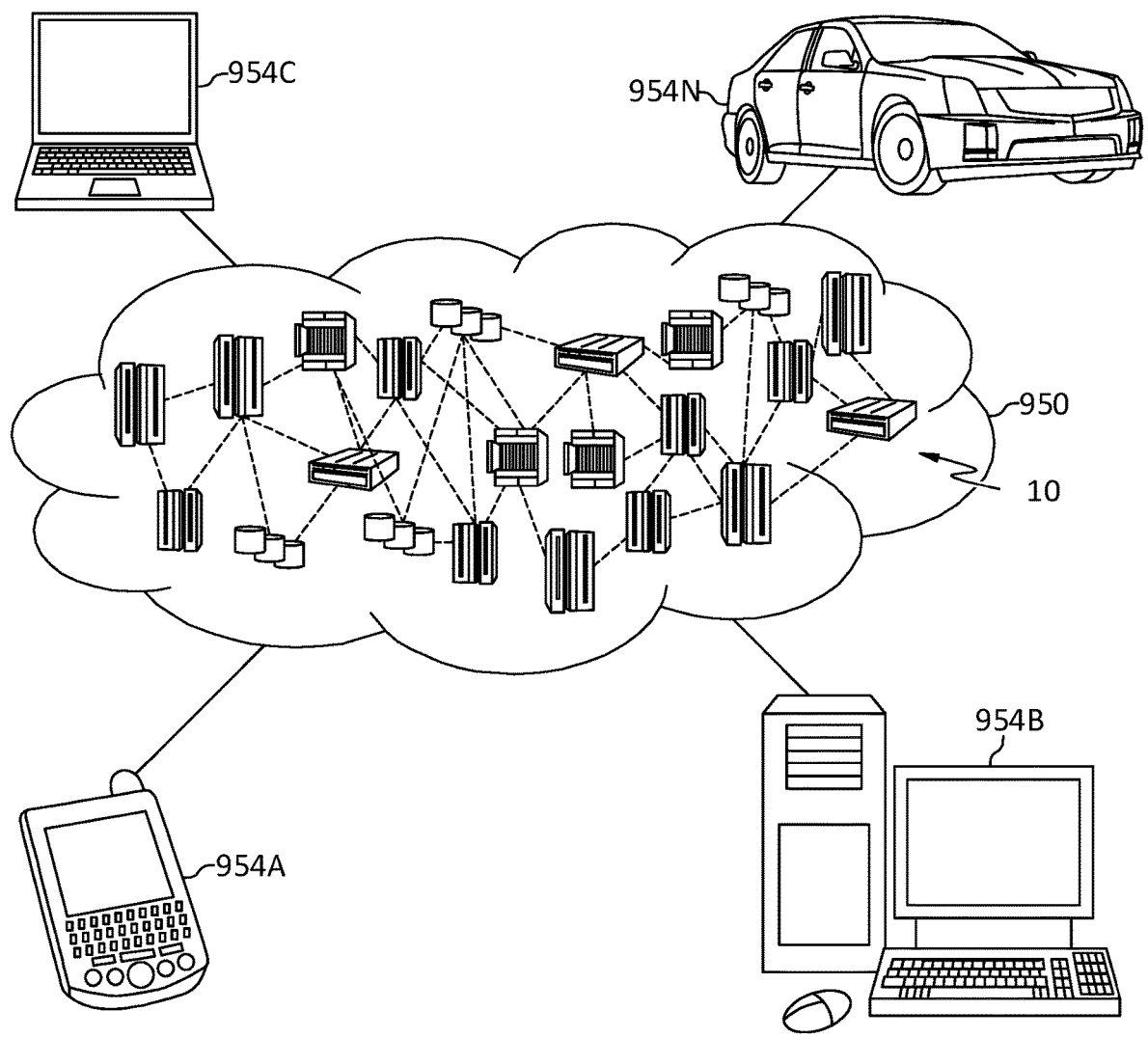
FIG. 9 depicts a cloud computing environment according to various embodiments of the present disclosure.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
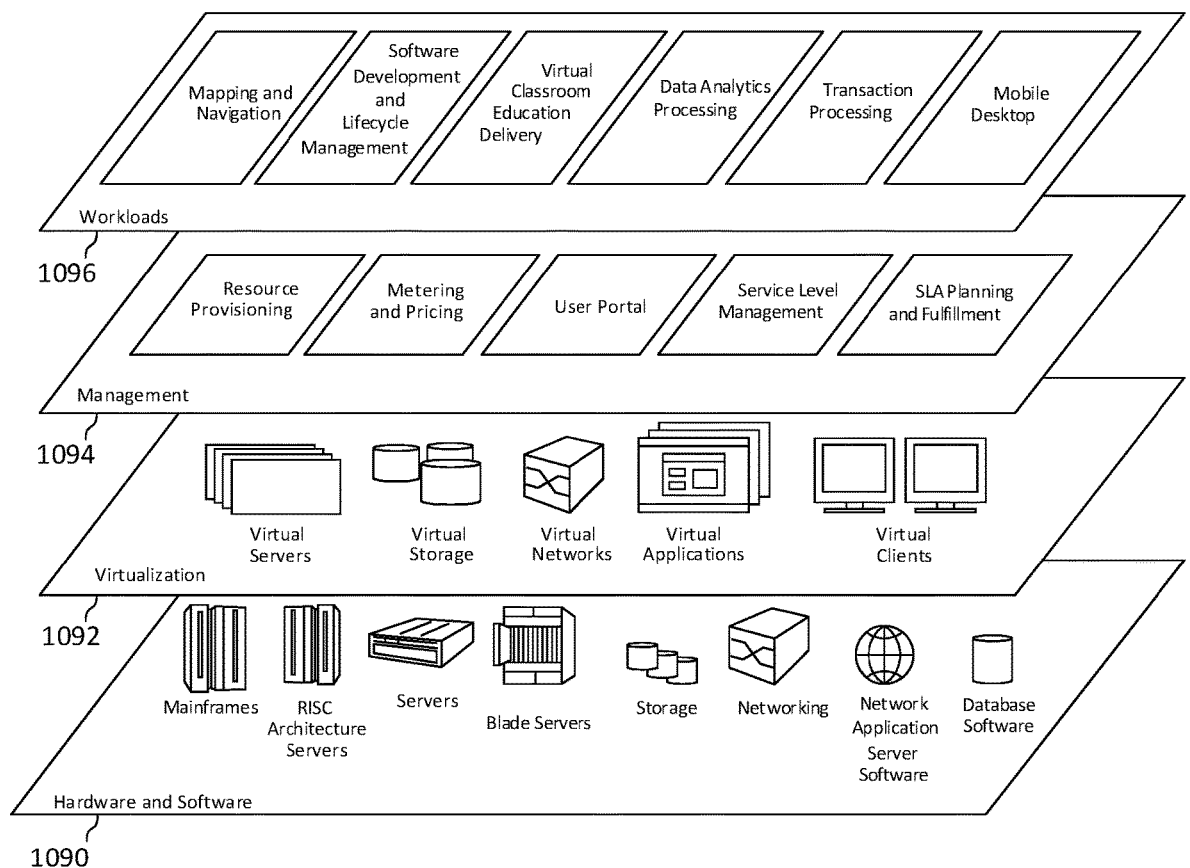
FIG. 10 depicts abstraction model layers according to various embodiments of the present disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1090 includes hardware and software components. Examples of hardware components include: mainframes; RISC (Reduced Instruction Set Computer) architecture based servers; storage devices; networks and networking components. In some embodiments, software components include network application server software.

Virtualization layer 1092 provides an abstraction layer from which the following examples of virtual entities may be provided: virtual servers; virtual storage; virtual networks, including virtual private networks; virtual applications and operating systems; and virtual clients.

In one example, management layer 1094 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1096 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

"Present disclosure" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present disclosure" is used to assist in indicating a portion or multiple portions of the disclosure that might possibly include an advancement or multiple advancements over the state of the art. This understanding of the term "present disclosure" and the indications and/or implications thereof are tentative and provisional and are subject to change during the course of patent prosecution as relevant information is developed and as the claims may be amended.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

What is claimed is:

1. A method for analyzing an object, wherein the method comprises:
    providing, to a processor, one or more input images of the object,
        wherein each input image comprises a plurality of input cells,
        wherein each input cell has an associated input value,
        wherein each input cell has a location identifier corresponding to a part of the object,
        wherein the input value is a density of the object at a part of the object corresponding to the input cell;
    providing, to the processor, one or more reference values, wherein the one or more reference values are densities;
    providing, to the processor, one or more reference shapes;
    identifying, by the processor, one or more candidate cells of the plurality of input cells based on the associated input value for one or more of the input cells and the one or more reference values;
    identifying, by the processor, one or more areas of interest based on the identified one or more candidate cells;
    comparing, by the processor, the one or more candidate cells to the one or more of the reference shapes to determine similarities;
    reporting, via the processor logically connected to a display, the one or more candidate cells and results of the comparison of the one or more candidate cells to the one or more of the reference shapes;
    scanning, by the cell identifier, the input cells of the input image to identify corresponding starting cells of the areas of interest according to a comparison of the input values with the value reference;
    initializing, by a classification engine, the areas of interest to the corresponding starting cells; and
    enlarging, by a rendering engine, each of the areas of interest according to a comparison of the input values of the input cells moving along a plurality of enlarging directions irradiating from each of the corresponding starting cells in the input image.

2. The method of claim 1, further comprising:
    comparing, by the processor, the identified candidate cells in two or more of the one or more input images; and
    rendering, by the processor, a three-dimensional shape of a candidate object based on the comparing the identified candidate cells in the two or more of the one or more input images.

3. The method according to claim 1, wherein the reporting comprises:
    outputting, by the processor, one or more of the input images with the one or more candidate cells highlighted.

4. The method according to claim 1, wherein the input images are a plurality of input images acquired with a computed tomography scanner, the input images providing representations of slices of the object.

5. The method according to claim 1, wherein the method comprises:
    simulating, by the processor, an effect irradiating a portion of the object represented, at least partially, by the one or more candidate cells; and
    outputting, by the processor, the effect.

6. The method according to claim 5, wherein the simulating further comprises:
    simulating, by the processor, a plurality of simulated cells with corresponding simulated input values according to a projection solid of the object;

determining, by the processor, beam lines for an irradiation of the object; and calculating, by the processor, the simulated values of each simulated cell according to a path of the beam lines according to the corresponding input value.

7. The method according to claim 1, further comprising:
wherein each input image is a representation of a slice of the object:

calculating, by the processor, a spacing of the slices the input images represent;

extracting, by the processor, the spacing of the slices from the input images to determine filling factors; and rendering, by the processor, a three-dimensional representation of the object based on the filling factors.

8. The method according to claim 1, wherein the method comprises:

receiving, by the processor, a baseline value to which the value references are referred from a memory;

identifying, by the processor, a limit value of the input values for each of the input images; and normalizing, by the processor, each of the input images according to a comparison between the limit values and the baseline value.

9. The method according to claim 1, wherein the identifying one or more areas of interest of each of the input images further comprises:

scanning, by the processor, the input cells of the input image to identify the starting cells of the areas of interest as corresponding to the input values best matching a distinguishing level indicated in the value reference; and enlarging, by the processor, each of the areas of interest until a variation of the corresponding input values is within a variation threshold and the input values remain within a distinguishing range around the distinguishing level indicated in the value reference.

10. The method according to claim 1, wherein the identifying one or more of the areas of interest further comprises:

identifying, by the processor, the areas of interest according to a comparison of a geometry, a boundary and/or a size of the areas of interest with a distinguishing geometry, a distinguishing boundary and/or a distinguishing size, respectively, indicated in the shape reference.

11. The method according to claim 1, wherein the method comprises:

collecting, by the processor, one or more reference images for each of the areas of interest;

determining, by the processor, the value reference and the shape reference for each area of interest according to a corresponding reference images; and storing, by the processor, a value reference and a shape reference of each for area of interest into a data store.

12. A computer program product for analyzing an object, the computer program product comprising a computer readable storage medium having program instructions embodied therewith, the program instructions readable, by a computing system, to cause the computing system to perform a method comprising:

providing, to a processor, one or more input images of the object, wherein each input image comprises a plurality of input cells, wherein each input cell has an associated input value, wherein each input cell has a location identifier corresponding to a part of the object, wherein the input value is a density of the object at a part of the object corresponding to the input cell;

providing, to the processor, one or more reference values;

providing, to the processor, one or more reference shapes;

identifying, by the processor, one or more candidate cells of the plurality of input cells based on the associated input value for one or more of the input cells and the one or more reference values wherein the one or more reference values are densities;

identifying, by the processor, one or more areas of interest based on the identified one or more candidate cells;

comparing, by the processor, two or more candidate cells to the one or more of the reference shapes to determine similarities;

reporting, via the processor logically connected to a display, the one or more candidate cells and results of the comparison of the two or more candidate cells to the one or more of the reference shapes;

scanning, by the cell identifier, the input cells of the input image to identify corresponding starting cells of the areas of interest according to a comparison of the input values with the value reference;

initializing, by a classification engine, the areas of interest to the corresponding starting cells; and enlarging, by a rendering engine, each of the areas of interest according to a comparison of the input values of the input cells moving along a plurality of enlarging directions irradiating from each of the corresponding starting cells in the input image.

13. A system for analyzing an object, wherein the system comprises:

a processor; and a memory in communication with the processor, the memory containing program instructions that, when executed by the processor, are configured to cause the processor to perform a method, the method comprising:

receive one or more input images of the object, one or more reference values, and one or more reference shapes, wherein each input image comprises a plurality of input cells, wherein each input cell has an associated input value, wherein each input cell has a location identifier corresponding to a part of the object, wherein the input value is a density of the object at a part of the object corresponding to the input cell;

identify one or more candidate cells of the plurality of input cells based on the associated input value for one or more of the input cells and one or more reference values and identify one or more areas of interest based on the identified one or more candidate cells, wherein the one or more reference values are densities;

compare one or more candidate cells to the one or more of the reference shapes to determine similarities;

report, via a display logically connected to the system, the one or more candidate cells and results of the comparison of the two or more candidate cells to the one or more of the reference shapes;

scanning, by the cell identifier, the input cells of the input image to identify corresponding starting cells of the areas of interest according to a comparison of the input values with the value reference;

initializing, by a classification engine, the areas of interest to the corresponding starting cells; and enlarging, by a rendering engine, each of the areas of interest according to a comparison of the input values of the input cells moving along a plurality of enlarging directions irradiating from each of the corresponding starting cells in the input image.

14. The system of claim 13,
wherein the processor is further configured to:
compare the identified one or more candidate cells in two or more of the one or more input images; and
render a three-dimensional shape of a candidate object based on the comparing.

15. The system according to claim 13, wherein the processor is further configured to output one or more of the input images with the one or more candidate cells being highlighted.

16. The system according to claim 13, wherein the input images are a plurality of input images acquired with a computed tomography scanner, the input images providing corresponding representations of slices of the object.

17. The system according to claim 13, wherein the processor is further configured to:
simulate an effect irradiating a portion of the object represented, at least partially, by the one or more candidate cells;
determine, beam lines for an irradiation of the object; and
classify a simulated value for each simulated cell according to a path of the beam lines according to a corresponding input value.

18. The system according to claim 13,
wherein each input image is a representation of a slice of the object;
wherein the processor is further configured to:
calculate a spacing of the slices the input images represent;
extract the spacing of the slices from the input images to determine filling factors; and
render a three-dimensional representation of the object based on the filling factors.

19. The system according to claim 13,
wherein the processor is further configured to receive a baseline value to which the value references are referred from the memory;
wherein the processor is further configured to identify a limit value of the input values for each of the input images; and
wherein the processor is further configured to compare each of the input images according to a comparison between the limit value of each input image and the baseline value.

* * * * *